(12) United States Patent
Sipe et al.

(10) Patent No.: US 8,121,383 B2
(45) Date of Patent: *Feb. 21, 2012

(54) AUTOMATED METHOD AND SYSTEM FOR SETTING IMAGE ANALYSIS PARAMETERS TO CONTROL IMAGE ANALYSIS OPERATIONS

(75) Inventors: Michael A. Sipe, Pittsburgh, PA (US); R. Terry Dunlay, Corrales, NM (US)

(73) Assignee: Cellomics, Inc., Pittsburgh, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/889,496

(22) Filed: Sep. 24, 2010

(65) Prior Publication Data

US 2011/0096977 A1   Apr. 28, 2011

Related U.S. Application Data

(62) Division of application No. 11/299,002, filed on Dec. 9, 2005, now Pat. No. 7,818,130.

(60) Provisional application No. 60/634,462, filed on Dec. 9, 2004.

(51) Int. Cl.
*G06K 9/00* (2006.01)
*G06K 9/20* (2006.01)
*G06K 9/36* (2006.01)
*G06F 19/10* (2011.01)

(52) U.S. Cl. ........ 382/133; 382/128; 382/282; 382/286; 702/19

(58) Field of Classification Search .................. None
See application file for complete search history.

(56) References Cited

U.S. PATENT DOCUMENTS

| | | | |
|---|---|---|---|
| 5,989,835 A | 11/1999 | Dunlay et al. |
| 6,573,039 B1 | 6/2003 | Dunlay et al. |
| 6,620,591 B1 | 9/2003 | Dunlay et al. |
| 6,671,624 B1 | 12/2003 | Dunlay et al. |
| 6,716,588 B2 | 4/2004 | Sammak et al. |
| 6,727,071 B1 | 4/2004 | Dunlay et al. |
| 6,756,207 B1 | 6/2004 | Giuliano et al. |
| 6,759,206 B1 | 7/2004 | Rubin et al. |
| 7,565,247 B1 | 7/2009 | Dunlay et al. |
| 2003/0013137 A1 | 1/2003 | Barak et al. |
| 2004/0029213 A1 | 2/2004 | Callahan et al. |
| 2004/0040044 A1 | 2/2004 | Muhonen |
| 2004/0248191 A1 | 12/2004 | Kirsch et al. |
| 2008/0262741 A1 | 10/2008 | Harris et al. |

OTHER PUBLICATIONS

Richard Baker, *Genetic Algorithms in Search and Optimization*, Financial Engineering News, vol. 5, XP-002377144, Jul. 5, 1998.
Kenneth A. Giuliano et al., *High-Content Screening: A New Approach to Easing Key Bottlenecks in the Drug Discovery Process*, Journal of Biomolecular Screenng, vol. 2, No. 4, 1997, pp. 249-259.
Ji-Hu Zhang et al., *A Simple Statistical Parameter for Use in Evaluation and Validation of High Throughput Screening Assays*, Journal of Biomolecular Screening, vol. 4, No. 2, 1999, pp. 67-73.
Randy, Wedin, *Bright Ideas for High-Throughput Screening—One-Step Fluorescence HTS Assays are Getting Faster, Cheaper, Smaller and More Sensitive*, Modern Drug Discovery, vol. 2(3), May/Jun. 1999, pp. 61-71.
S.R. Arden et al., *An Automated Quantitative High Content Screening Assay for Neurite Outgrowth*, Chemistry Today (2002) 20:64-66.
H.P. Lovborg, et al., *Multiparametric Evaluation of Apoptosis: Effects of Standard Cytotoxic Agents and the Cyanoguanidine*, CHS 828, Mol. Cancer Ther. (2004) 3:521-526.
K.M. Bhawe, et al., *An Automated Image Capture and Quantitation Approach to Identify Proteins Affecting Tumor Cell Proliferation*, Journal of Biomolecular Screening (2004) 9(3):216-222.
F. Gasparri et al., *Quantification of the Proliferation Index of Human Dermal Fibroblast Cultures with the ArrayScan High Content Screening Reader*, Journal of Biomolecular Screening (2004) 9(3):232-243.
B.D. Schlag et al., *Ligand Dependency of 5-HT2C Receptor Internalization*, J Pharmacol Exp Ther. (2004) vol. 310, No. 3, pp. 865-870.
A. Vogt et al., *A Scalable High-Content Cytotoxicity Assay Insensitive to Changes in Mitochondrial Metabolic Activity*, Oncol. Res. (2004) 14: 305-315.
J.M. Minguez et al., *Synthesis and Biological Assesment of Simplified Analogues of the Potent Microtubule Stabilizer (+)—Discodermolide*, Bioorg Med Chem. (2003) 11:3335-3357.
A. Vogt et al. *Cell-active Dual Specificity Phosphatase Inhibitors Identified by High-content Screening*, Chemistry & Biology, (2003) vol. 10:733-42.
Y.I. Kawamura et al., *Cholera Toxin Activates Dendritic Cells Through Dependence on GM1-Ganglioside which is ediated by NF-κB translocation*, Eur. J. Immunol. (2003) 33:3205-3212.
Z. Li, et al., *Identification of Gap Junction Blockers Using Automated Fluorescence Microscopy Imaging*, J Biomol Screen (2003) 8(5):489-499.
K.A. Giuliano et al., *Advances In High Content Screening For Drug Discovery*, Assay and Drug Development Technologies, (2003) vol. 1, No. 4, pp. 565-577.
K.A. Giuliano, *High-Content Profiling of Drug-Drug Interactions: Cellular Targets Involved In The Modulation of Microtuble Drug Action by The Antifungal Ketoconazole*, J Biomol Screen (2003) 8(2)125-35.
J.M. Minguez et al., *Synthesis and High Content Cell-based Profiling of Simplified Analogues of the Microtubule Stabilizer (+)—Discodermolide*, Mol Cancer Ther (2002) 1:1305-1313.

(Continued)

*Primary Examiner* — Lori A Clow
(74) *Attorney, Agent, or Firm* — Workman Nydegger

(57) ABSTRACT

A method and system for setting image analysis parameters to control image analysis operations. The method and system include collecting set of digital training images including a set of states for the set of digital training images. An objective function is defined to determine a relative quality of plural different parameter sets used for digital image analysis. Values for the plural different parameter sets that maximize (or minimize) the objective function are determined. The method and system increases a usability of high content screening technologies by reducing a required level of expertise required to configure digital image processing.

9 Claims, 16 Drawing Sheets

OTHER PUBLICATIONS

R. Kapur, *Fluorescence Imaging and Engineered Biosensors: Functional and Activity-Based Sensing Using High Content Screening,* Amm NY Acad Sci., (2002) 961:196-197.

J. Chen et al., *Microarray Analysis of Tbx2-Directed Gene Expression: A Possible Role In Osteogenesis,* Mol Cell Endocrinol (2001) 177:43-54.

J.R. Haskins et al., *Thiazolidinedione Toxicity to Isolated Hepatocytes Revealed by Coherent Multiprobe Fluorescence Microscopy and Correlated with Multiparameter flow Cytometry of Peripheral Leukocytes,* Arch Toxicol (2001) 75(7):425-38.

H. Blumberg et al., *Interleukin 20: Discovery, Receptor Identification, and Role in Epidermal Function,* Cell (Jan. 12, 2001) vol. 104, pp. 9-19.

A. Vogt et al., *Spatial Analysis of Key Signaling Proteins by High-Content Solid Phase Cytometry in Hep3B Cells Treated With an Inhibitor of Cdc25 Dual-Specificity Phosphatases,* J Bioi Chem (Jun. 8, 2001) 276(23):20544-20550.

P.B. Simpson et al., *Retinoic Acid-Evoked Differentiation of Neuroblastoma Cells Predominates Over Growth Factor Stimulation: An Automated Image Capture and Quantitation Approach to Neuritogenesis,* Anal. Biochem. (2001) 298:163-169.

B.R. Conway et al., *Quantitative Analysis of Agonist-Dependent Parathyroid Hormone Receptor Trafficking in Whole Cells Using A Functional Green Fluorescent Protein Conjugate,* J Cell Physiol (2001) 189:341-355.

P. Wipf et al., *Synthesis and Biological Evaluation of A Focused Mixture Library of Analogues of The Antimitotic Marine Natural Product Curacin A,* Journal of American Chemical Society (2000) 122:9391-9395. Also attached is supplemental supporting material.

R.N. Ghosh et al., *Cell-Based, High Content Screen for Receptor Internalization, Recycling and Intracellular Trafficking,* Biotechniques (2000) 29(1):170-175.

M.A. Brieder et al., *Troglitazone-Induced Heart and Adipose Tissue Cell Proliferation In Mice,* Toxicol Pathol, (1999) 27(5):545-52.

B.R. Conway et al., *Quantification of G-Protein Coupled Receptor Internalization Using G-Protein Coupled Receptor-Green Fluorescent Protein Conjugate With the ArrayScan™ High-Content Screening System,* J Biomol Screen (1999) 4(2):75-86.

G.J.F. Ding et al., *Characterization and Quantitation of Nf-kB Nuclear Translocation Induced by Interleukin-1 and Tumor Necrosis Factor-α,* J Bio Chem (Oct. 1998) 273(44):28897-28905.

V. Abraham et al., *High Content Screening Applied to Large-Scale Cell Biology,* Trends Biotechnol, (Jan. 2004) 22(1):15-22.

P. Gribbon and A. Sewing, *Fluorescence Readouts in HTS: No Gain Without Pain?,* Drug Disc Today (2003) 8(22):1035-1043.

K.A. Giuliano et al., *Screening Lead Compunds in The Postgenomic Era: An Integrated Approach to Knowledge Building from The Cellome,* In: Integrated Drug Discovery Technologies, H-Y Mei, AW Czarnik (eds). New York: Marcel Dekker (2002).

R.A. Blake, *Cellular Screening Assays Using Fluorescence Microscopy,* Curr Opin Pharmacol, (2001) 1:533-538.

C. Liptrot, *High Content Screening—From Cells to Data to Knowledge,* Drug Discovery Today (2001) 6(16):832-834.

D.R. Jung et al., *Topographical and Physicochemical Modification of Material Surface to Enable Patterning of Living Cells,* Critical Rev Biotechnol (2001) 21(2):111-154.

D.L. Taylor et al., *Real-time Molecular and Cellular Analysis: The New Frontier of Drug Discovery,* Curr Opin Biotechnol (2001) 12:75-81.

K.A. Giuliano and DL Taylor, *Fluorescent-Protein Biosensors: New Tools for Drug Discovery,* TIBTECH, vol. 16, No. 3, Mar. 1998, pp. 99-146.

S. Keating, *Managing Data Life Cycle from Creation to Deletion: Roche Implements Tiered Storage Solutions for Managing its Vast and Growing Amount of Cellular Imaging Data,* Drug Discovery & Development, Jun. 2004.

R. Ghosh and JR Haskins, *A Flexible Large-Scale Biology Software Module for Automated Quantitative Analysis of Cell Morphology,* in Business Briefings: Future Drug Discovery 2004, pp. 1-4.

J. Comley and S. Fox, *Growing Market for High Content Analysis Tools,* Drug Disc. World, Spring 2004, pp. 25-34.

A. DePalma, *Bioprocessing: Tactics for Monitoring and Delaying Apoptosis,* Gen. Eng. News (Feb. 2004) 24(4):48-49.

J.L. Smith, *Picture Perfect: To Facilitate Analysis, Researchers Are Enlisting an Image Informatics Solution for High-Content Screening,* Mod Drug Disc. (Jan. 2004) 7: 45-46.

A. Shah, *In Automated Microscopy, Image Is Everything: High-Content Information Offers Both Multiparameter and Cell-Based Information in A Screening Feasible Format,* Drug Discovery & Development, Jan. 2004 pp. 52-57.

J. Boguslavsky, *New Year Tools for the 'New' Biology,* Bio-IT World, Jan. 12, 2004.

S. Simons, *Drug Discovery: Determining When to Apply Toxicology Screens,* Gen Eng News (2003) 23(5):29.

C. Coty, *A Broader View of Cells Via High-Content Screening,* Drug Discovery & Development (Feb. 2003) 6(2):33-36.

K.A. Giuliano et al., *Fluorescent Protein Biosensors, A New Screening Tool Moves Drug Targets Out of the Test Tube and into the Cell,* Modern Drug Discovery, Aug. 2003:33-37.

L. Schultz, *Seeing is Believing: Cellualr Imaging as Discovery Tools,* Drug Discovery & Development, Dec. 2003, pp. 57-60.

M. Jones, *As High-Content Screening Gains Traction, Cellomics Launches Center of Excellence to Stay on Top,* Genomeweb, Dec. 8, 2003.

M.A. Branca, *Scenes From A Cell: Breakthrough are Making Cell-Based Screening Faster Easier, More Powerful,* BioIT World Dec. 15, 2003.

J. Boguslavsky, *Fully Equipped, Cellular Screening in Sync.,* Bio-IT World, Sep 11, 2003.

T. Chapman, *Seeing is Believing,* Nature 425:867-873 (2003).

O.J. Trask and TH Large, *Automated imaging: applications to drug discovery,* Current Drug Discovery, Sep. 2001, pp. 25-29.

J. Boguslavsky, *High Throughput Screening—Get the Most Out of Cell Culture,* Drug Discovery & Development, Oct. 2000, p. 42-44.

R. Kapur et al., *Streamlining The Drug Discovery Process by Integrating Miniaturization, High Throughput Screening, High Content Screening, and Automation on The CeliChip™ System,* Biomed Microdevices 2(2):99-109 (1999).

R. Kapur, *Smarter Lead Optimization Enabled,* Drug Discovery & Development. May 1999, p. 61-62.

Fox et al. *Journal of Cell Science* (1999) vol. 99, pp. 247-253.

Office Action from U.S. Appl. No. 11/299,002 dated Nov. 20, 2009.

Office Action from U.S. Appl. No. 11/299,002 dated May 11, 2010.

Notice of Allowance from U.S. Appl. No. 11/299,002 dated Jun. 16, 2010.

Office Action from related EPO Application No. 05853494.2 dated Nov. 26, 2008.

International Preliminary Report on Patentability dated Jun. 21, 2007 from related International Application No. PCT/US2005/044590.

Office Action from related U.S. Appl. No. 12/889,483 dated Jul. 7, 2011.

U.S. Appl. No. 12/889,483, mailed Nov. 17, 2011, Office Action.

FIG. 5
(A) UNTREATED
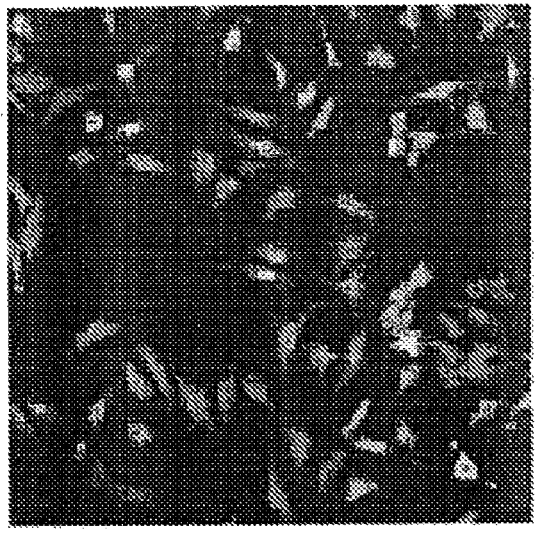
(B) TREATED WITH TNF-α

FIG. 6
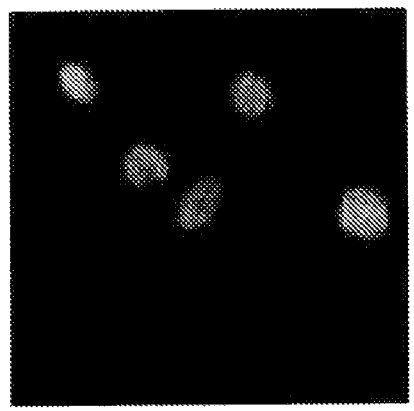
A
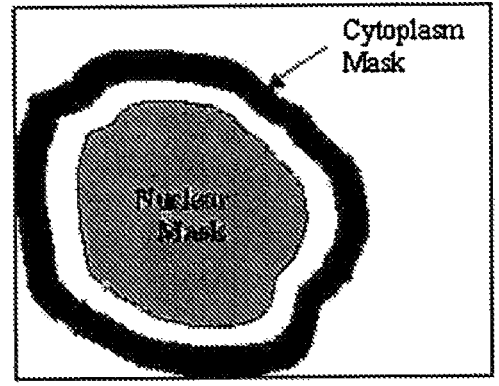
B
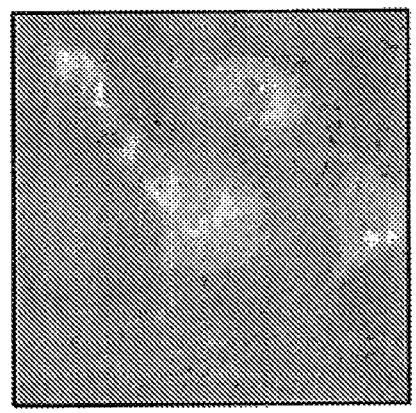
C
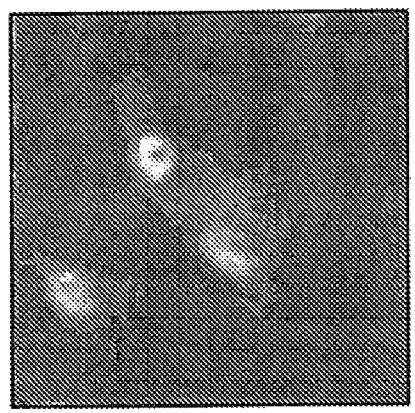
D
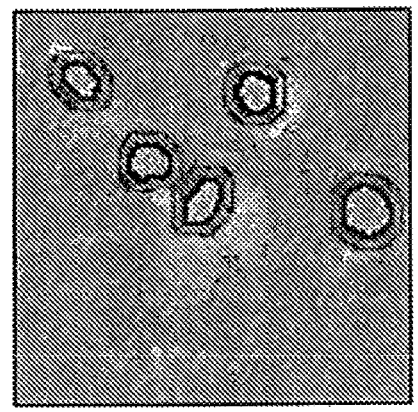
E
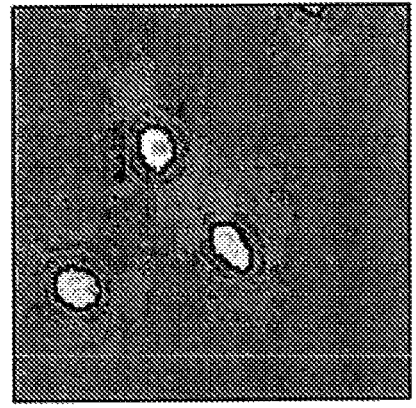
F

FIG. 11
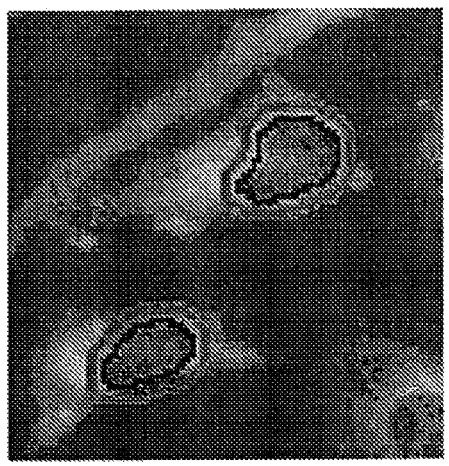 
MANUAL　　　　　　　　　　GA

AUTOMATED METHOD AND SYSTEM FOR SETTING IMAGE ANALYSIS PARAMETERS TO CONTROL IMAGE ANALYSIS OPERATIONS

CROSS REFERENCES TO RELATED APPLICATIONS

This application is a divisional of U.S. patent application Ser. No. 11/299,002, filed on Dec. 9, 2005, now U.S. Pat. No. 7,818,130, which claims priority to U.S. Provisional Patent Application No. 60/634,462, filed on Dec. 9, 2004, the contents of which are hereby incorporated by reference.

COPYRIGHT NOTICE

Pursuant to 37 C.F.R. 1.71(e), applicants note that a portion of this disclosure contains material that is subject to and for which is claimed copyright protection, such as, but not limited to, digital photographs, screen shots, user interfaces, or any other aspects of this submission for which copyright protection is or may be available in any jurisdiction. The copyright owner has no objection to the facsimile reproduction by anyone of the patent document or patent disclosure, as it appears in the Patent and Trademark Office patent file or records. All other rights are reserved, and all other reproduction, distribution, creation of derivative works based on the contents, public display, and public performance of the application or any part thereof are prohibited by applicable copyright law.

BACKGROUND OF THE INVENTION

1. The Field of the Invention

This invention relates to digital image processing. More specifically, it relates to a method and system for setting image analysis parameters to control image analysis operations.

2. The Relevant Technology

Innovations in automated screening systems for biological and other research are capable of generating enormous amounts of data. The massive volumes of feature-rich data being generated by these systems and the effective management and use of information from the data has created a number of very challenging problems. As is known in the art, "feature-rich" data includes data wherein one or more individual features of an object of interest (e.g., a cell) can be collected. To fully exploit the potential of data from high-volume data generating screening instrumentation, there is a need for new methods to optimally set the image analysis parameters that control the image analysis operations that generate this feature rich data.

Identification, selection, validation and screening of new drug compounds or cures for disease is often completed at a nucleotide level using sequences of Deoxyribonucleic Acid ("DNA"), Ribonucleic Acid ("RNA") or other nucleotides. "Genes" are regions of DNA, and "proteins" are the products of genes. The existence and concentration of protein molecules typically help determine if a gene is "expressed" or "repressed" in a given situation. Responses of genes to natural and artificial compounds are typically used to improve existing drugs, and develop new drugs. However, it is often more appropriate to determine the effect of a new compound on a cellular level instead of a nucleotide level.

Cells are the basic units of life and integrate information from DNA, RNA, proteins, metabolites, ions and other cellular components. New compounds that may look promising at a nucleotide level may be toxic at a cellular level. Florescence-based reagents can be applied to cells to determine ion concentrations, membrane potentials, enzyme activities, gene expression, as well as the presence of metabolites, proteins, lipids, carbohydrates, and other cellular components.

There are two types of cell screening methods that are typically used: (1) fixed cell screening; and (2) live cell screening. For fixed cell screening, initially living cells are treated with experimental compounds being tested. No environmental control of the cells is provided after application of a desired compound and the cells may die during screening. Live cell screening requires environmental control of the cells (e.g., temperature, humidity, gases, etc.) after application of a desired compound, and the cells are kept alive during screening. Fixed cell assays allow spatial measurements to be obtained, but only at one point in time. Live cell assays allow both spatial and temporal measurements to be obtained.

The spatial and temporal frequency of chemical and molecular information present within cells makes it possible to extract feature-rich cell information from populations of cells. For example, multiple molecular and biochemical interactions, cell kinetics, changes in sub-cellular distributions, changes in cellular morphology, changes in individual cell subtypes in mixed populations, changes and sub-cellular molecular activity, changes in cell communication, and other types of cell information can be obtained.

The types of biochemical and molecular cell-based assays now accessible through fluorescence-based reagents is expanding rapidly. The need for automatically extracting additional information from a growing list of cell-based assays has allowed automated platforms for feature-rich assay screening of cells to be developed. For example, the ArrayScan System and the KineticScan System by Cellomics, Inc. of Pittsburgh, Pa., are such feature-rich cell screening systems. Cell based imaging systems such as Discovery 1, ImageExpress, and FLIPR, by Molecular Devices, Inc. of Sunnyvale, Calif., IN Cell Analyzer 1000 and IN Cell Analyzer 1000, by General Electric Healthcare of Little Chalfont, United Kingdom, Pathway HT, by BD Biosciences or Rockville, Md., and others also generate large amounts of data and photographic images that would benefit from efficient data management solutions. Photographic images are typically collected using a digital camera. Collecting and storing a large number of photographic images adds to the data problems encountered when using high throughput systems. For more information on fluorescence based systems, see "Bright ideas for high-throughput screening—One-step fluorescence HTS assays are getting faster, cheaper, smaller and more sensitive," by Randy Wedin, Modern Drug Discovery, Vol. 2(3), pp. 61-71, May/June 1999.

Such automated feature-rich cell screening systems and other systems known in the art typically include microplate scanning hardware, fluorescence excitation of cells, fluorescence captive emission optics, a photographic microscope with a camera, data collection, data storage and data display capabilities. For more information on feature-rich cell screening see "High content fluorescence-based screening," by Kenneth A. Guiliano, et al., Journal of Biomolecular Screening, Vol. 2, No. 4, pp. 249-259, Winter 1997, ISSN 1087-0571, "PTH receptor internalization," Bruce R. Conway, et al., Journal of Biomolecular Screening, Vol. 4, No. 2, pp. 75-68, April 1999, ISSN 1087-0571, "Fluorescent-protein biosensors: new tools for drug discovery," Kenneth A. Giuliano and D. Lansing Taylor, Trends in Biotechnology, ("TIBTECH"), Vol. 16, No. 3, pp. 99-146, March 1998, ISSN 0167-7799, all of which are incorporated by reference.

An automated feature-rich cell screening system typically automatically scans a microplate plate with multiple wells and acquires multi-color fluorescence data of cells at one or more instances of time at a pre-determined spatial resolution. Automated feature-rich cell screen systems typically support multiple channels of fluorescence to collect multi-color fluorescence data at different wavelengths and may also provide the ability to collect cell feature information on a cell-by-cell basis including such features as the size and shape of cells and sub-cellular measurements of organelles within a cell.

The need for optimal setting of image analysis parameters is not limited to feature-rich cell screening systems or to cell based arrays. Virtually any instrument that runs High Throughput Screening ("HTS") assays also utilize optimal parameter settings to generate data from analysis routines.

In feature-rich cell screening systems, image analysis methods are typically controlled by a set of input parameters that allow the user to adjust them to perform in a given environment. Automated high content cell-based screening methods and software have input parameters that control how they process the fluorescence images collected by cell screening instruments. These parameters must be adjusted to match the biological cell type, the biological target within a cell, and the imaging conditions used in a particular assay.

Considerable effort is expended in identifying optimal image analysis parameters to produce the ideal protocols to accompany validated high content assay method and software products. Likewise, end users of such high content assay method and software products expend considerable effort in tuning image analysis protocol parameters to suit their biology and have identified this process as a usability issue.

Current methods of setting image analysis parameters to control image analysis operations consist of: (1) Manually creating analysis protocols with different processing parameters—using expert domain knowledge—and storing them in a file or database; (2) Running the application using each analysis protocol on stored image data or in real-time; (3) Exporting the resulting plate data for analysis and comparison using expert domain knowledge; and repeating these three steps until the results are satisfactory.

However, such methods may not provide satisfactory results. Thus, it is desirable provide methods of digital image analysis that are faster, far less tedious, and mitigate the need for detailed knowledge of the underlying image.

SUMMARY OF THE INVENTION

In accordance with preferred embodiments of the present invention, some of the problems associated with analyzing digital images are overcome. A method and system for setting image analysis parameters to control digital image analysis operations is provided.

The method and system include collecting a set of digital training images including a set of states for the set of digital training images. An object function is defined to determine a relative quality of plural different parameter sets used for digital image analysis. Values for the plural different parameter sets that maximize (or minimize) the objective function are determined.

The foregoing and other features and advantages of preferred embodiments of the present invention are more readily apparent from the following detailed description. The detailed description proceeds with references to the accompanying drawings.

BRIEF DESCRIPTION OF THE DRAWINGS

Preferred embodiments of the present invention are described with reference to the following drawings, wherein:

FIG. 5 is a block diagram illustrating images from an exemplary NFκB marker channel;

FIG. 6 is a block diagram illustrating applying an image mask to cytoplasm-to-nucleus translocation to an NF-κB assay;

FIG. 11 is a block diagram illustrating the difference between the manual protocol and GA parameter settings;

DETAILED DESCRIPTION OF THE PREFERRED EMBODIMENTS

Exemplary Digital Image Analysis System

Figure 1:
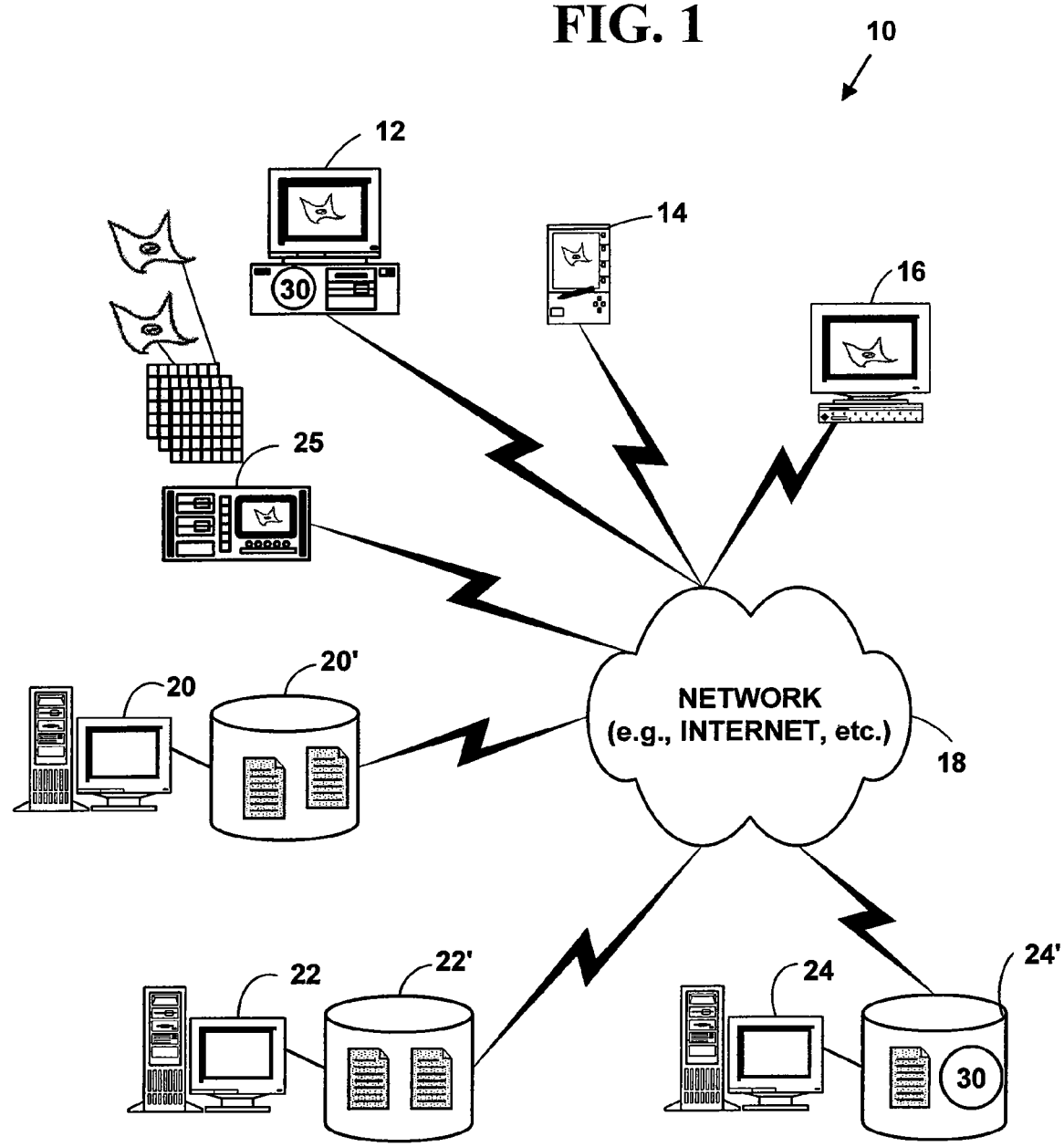
FIG. 1 is a block diagram illustrating an exemplary digital image processing system.

FIG. 1 is a block diagram illustrating an exemplary digital image processing system 10. The exemplary digital image system 10 includes, but is not limited to, one or more target devices 12, 14, 16 (only three of which are illustrated). However, the present invention is not limited to these target electronic devices and more, fewer or others types of target electronic devices can also be used.

The target devices 12, 14, 16 are in communications with a communications network 18. The communications includes, but is not limited to, communications over a wire connected to the target network devices, wireless communications, and other types of communications using one or more communications and/or networking protocols.

Plural server devices 20, 22, 24 (only three of which are illustrated) include one or more associated databases 20', 22', 24'. The plural network devices 20, 22, 24 are in communications with the one or more target devices 12, 14, 16 via the communications network 18. The plural server devices 20, 22, 24, include, but are not limited to, World Wide Web servers, Internet servers, file servers, other types of electronic information servers, and other types of server network devices (e.g., edge servers, firewalls, routers, gateways, etc.).

The plural server devices 20, 22, 24 include, but are not limited to, servers used for collecting digital images, servers for displaying digital images, servers for interacting with laboratory equipment such as microscopes, robots, etc.

The one or more target devices 12, 14, 16 include, but are not limited to, client terminals in communications with one or more servers, or with personal digital/data assistants (PDA), laptop computers, mobile computers, Internet appliances, two-way pagers, mobile phones, or other similar desktop, mobile or hand-held electronic devices. Other or equivalent devices can also be used to practice the invention.

The communications network 18 includes, but is not limited to, the Internet, an intranet, a wired Local Area Network (LAN), a wireless LAN (WiLAN), a Wide Area Network (WAN), a Metropolitan Area Network (MAN), a Public Switched Telephone Network (PSTN) and other types of communications networks 18.

The communications network 18 may include one or more gateways, routers, bridges or switches. As is known in the art, a gateway connects computer networks using different network protocols and/or operating at different transmission capacities. A router receives transmitted messages and forwards them to their correct destinations over the most efficient available route. A bridge is a device that connects networks using the same communications protocols so that information can be passed from one network device to another. Switches typically operate at the data link layer and sometimes the network layer therefore supports virtually any packet protocol.

The communications network 18 may include one or more servers and one or more web-sites accessible by users to send and receive information useable by the one or more computers 12. The one or more servers, may also include one or more associated databases for storing electronic information.

The communications network 18 includes, but is not limited to, data networks using the Transmission Control Protocol (TCP), User Datagram Protocol (UDP), Internet Protocol (IP) and other data protocols.

As is know in the art, TCP provides a connection-oriented, end-to-end reliable protocol designed to fit into a layered hierarchy of protocols which support multi-network applications. TCP provides for reliable inter-process communication between pairs of processes in network devices attached to distinct but interconnected networks. For more information on TCP see Internet Engineering Task Force (ITEF) Request For Comments (RFC)-793, the contents of which are incorporated herein by reference.

As is known in the art, UDP provides a connectionless mode of communications with datagrams in an interconnected set of computer networks. UDP provides a transaction oriented datagram protocol, where delivery and duplicate packet protection are not guaranteed. For more information on UDP see IETF RFC-768, the contents of which incorporated herein by reference.

As is known in the art, IP is an addressing protocol designed to route traffic within a network or between networks. IP is described in IETF Request For Comments (RFC)-791, the contents of which are incorporated herein by reference. However, more fewer or other protocols can also be used on the communications network 18 and the present invention is not limited to TCP/UDP/IP.

The digital image analysis system 10 further includes plural analysis instruments 25 (one of which is illustrated), comprise a feature-rich array scanning system capable of collecting and/or analyzing experimental data such as cell experimental data from microplates, DNA arrays or other chip-based or bio-chip based arrays. Bio-chips include any of those provided by Motorola Corporation of Schaumburg, Ill., Packard Instrument, a subsidiary of Packard BioScience Co. of Meriden, Conn., Genometrix, Inc. of Woodlands, Tex., and others.

Analysis instruments 25 include any of those provided by Cellomics, Inc. of Pittsburgh, Pa., Molecular Devices, Inc. of Sunnyvale, Calif., General Electric Healthcare of Little Chalfont, United Kingdom, BD Biosciences of Rockville, Md., and others.

Exemplary Digital Image Display System

Figure 2:
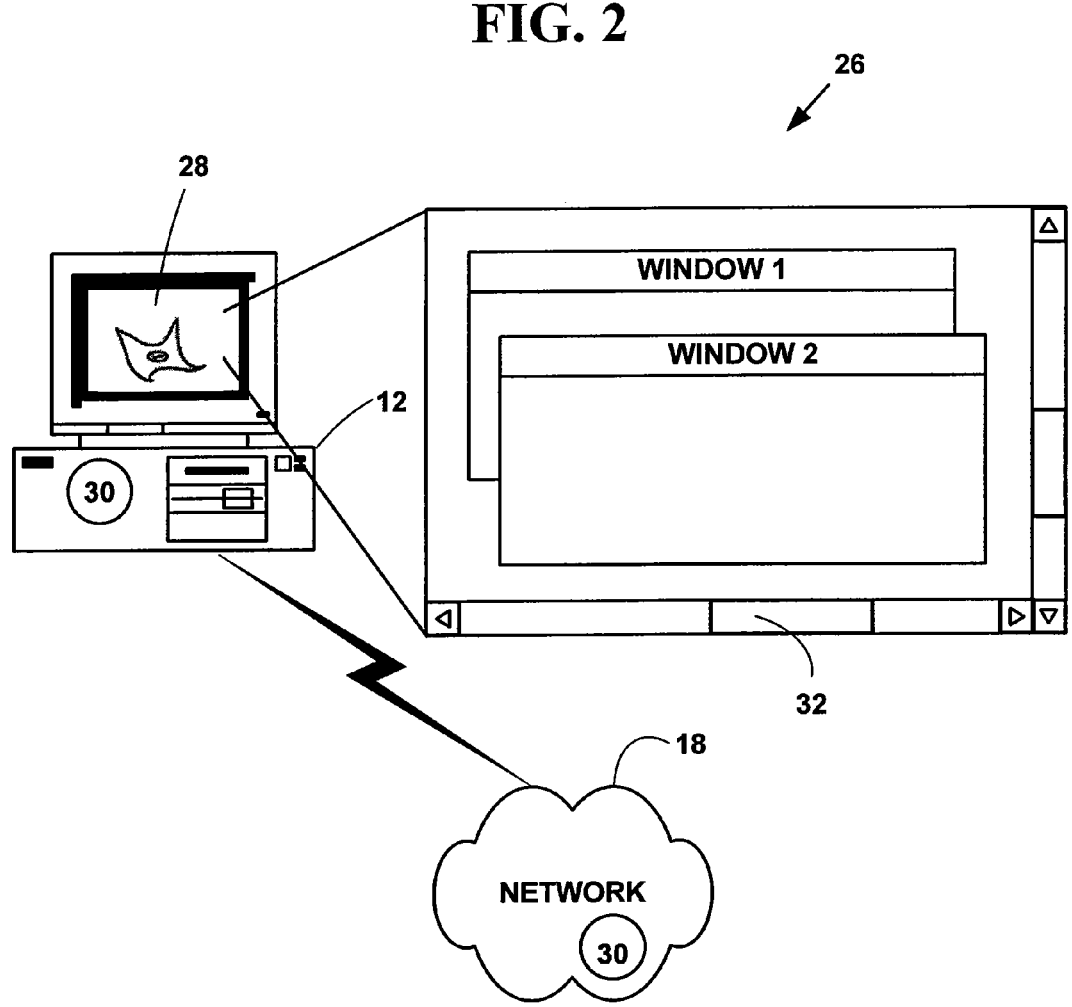
FIG. 2 is a block diagram illustrating an exemplary digital image display system.

FIG. 2 is a block diagram illustrating an exemplary digital image display system 26. The exemplary digital image display system 26 includes, but is not limited to a target device (e.g., 12) with a display 28. The target device includes an application 30 that presents a graphical user interface (GUI) 32 on the display 28. The GUI 32 presents a multi-window interface to a user.

In one embodiment of the invention, the application 30 is a software application. However, the present invention is not limited to this embodiment and the application 30 can be firmware, hardware or a combination thereof. In one embodiment, the application 30 exists only on a target device. In another embodiment, the application exists on both the target device 12, 14, 16 and a server device 20, 22, 24.

An operating environment for the devices of the digital image analysis system 10 and digital image display system 26 include a processing system with one or more high speed Central Processing Unit(s) ("CPU"), processors and one or more memories. In accordance with the practices of persons skilled in the art of computer programming, the present invention is described below with reference to acts and symbolic representations of operations or instructions that are performed by the processing system, unless indicated otherwise. Such acts and operations or instructions are referred to as being "computer-executed," "CPU-executed," or "processor-executed."

It is appreciated that acts and symbolically represented operations or instructions include the manipulation of electrical signals by the CPU or processor. An electrical system represents data bits which cause a resulting transformation or reduction of the electrical signals, and the maintenance of data bits at memory locations in a memory system to thereby reconfigure or otherwise alter the CPU's or processor's operation, as well as other processing of signals. The memory locations where data bits are maintained are physical locations that have particular electrical, magnetic, optical, or organic properties corresponding to the data bits.

The data bits may also be maintained on a computer readable medium including magnetic disks, optical disks, organic memory, and any other volatile (e.g., Random Access Memory ("RAM")) or non-volatile (e.g., Read-Only Memory ("ROM"), flash memory, etc.) mass storage system readable by the CPU. The computer readable medium includes cooperating or interconnected computer readable medium, which exist exclusively on the processing system or can be distributed among multiple interconnected processing systems that may be local or remote to the processing system.

Digital Image Analysis of Cells

In one embodiment of the invention, it is desirable to find near optimal values of parameters that control computer-based digital image analysis operations. The use of parameters to control how analysis is performed is typical of computer-based image analysis methods. Such parameters allow an image analysis method to be reconfigured to suit new environments (e.g., new biological cell types, new sub-cellular targets, or new imaging conditions, etc.) without recoding the image analysis method itself. One application area of the method is High Content Screening (HCS) applications where image analysis protocol parameters control how biologically relevant information is extracted from fluorescence images of cells. (See, for example, U.S. Pat. Nos. 5,989,835; 6,573,039; 6,620,591; 6,671,624; 6,671,624; 6,716,588; 6,727,071; 6,756,207; and 6,759,206).

In HCS, cells of interest are typically selected for further analysis by segmenting the cells from other objects or the background of the image being analyzed. The HCS protocol parameters include, for example, criteria on the intensity, shape, and size of connected objects that are used to determine which connected objects in an image are regarded as cells. The analysis protocol parameters also specify how to extract features from a sub-image containing a given cell. The invention improves the usability of HCS technology by reducing the manual labor and the required level of expertise required to set these parameters to achieve the desired results. As an example of parameters that can be set, an HCS image analysis method for measuring cytoplasm-to-nucleus translocation (see, e.g., U.S. Pat. No. 5,989,835) uses parameters as illustrated herein to specify image masks.

Obstacles to Optimization of Traditional Circular and Ring Masks

Figure 3:
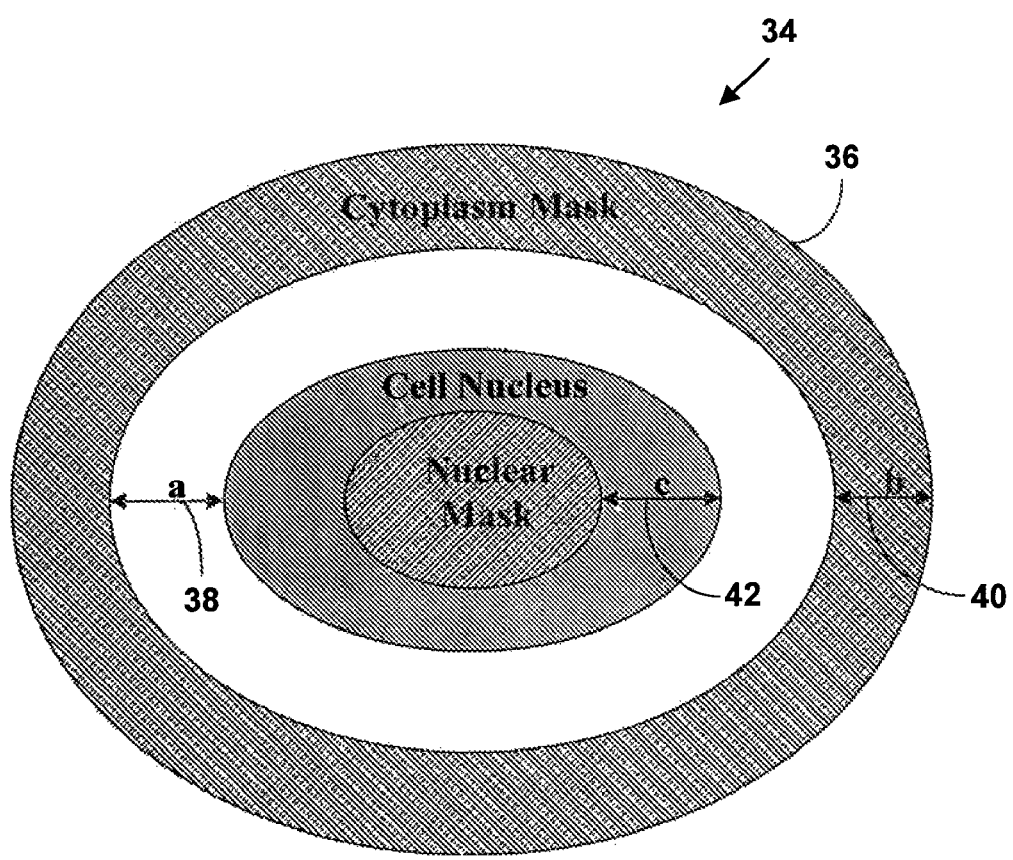
FIG. 3 is a block diagram illustrating an exemplary digital image mask.

FIG. 3 is a block diagram 34 illustrating an exemplary digital image mask 36. A Ring Distance 38 specifies a distance (a) from a nuclear boundary to a cytoplasm mask. A Ring Width 40 specifies a width (b) of a cytoplasm mask. A Circular (Circ) modifier 42 specifies a distance (c) within the nucleus to place the nuclear mask. FIG. 3 illustrates exemplary parameters pertinent to circular/ring configuration used for cell analysis.

It is typically not possible to use gradient-based search strategies such as "hill climbing" and others when optimizing these cell analysis parameters because objective functions (e.g. Z', etc.) are not differentiable with respect to these parameters. A derivative typically cannot be computed because the objective function is not a smooth function of the analysis parameters since the analysis parameters are discrete and the set of image pixels involved in the computation may change with the value of the analysis parameters.

The methods of the present invention may be used to adjust HCS image analysis protocol parameters to suit particular biological conditions such as cell type, target cells, staining, etc.

Automatically Determining Digital Image Analysis Protocol Parameters

Figure 4:
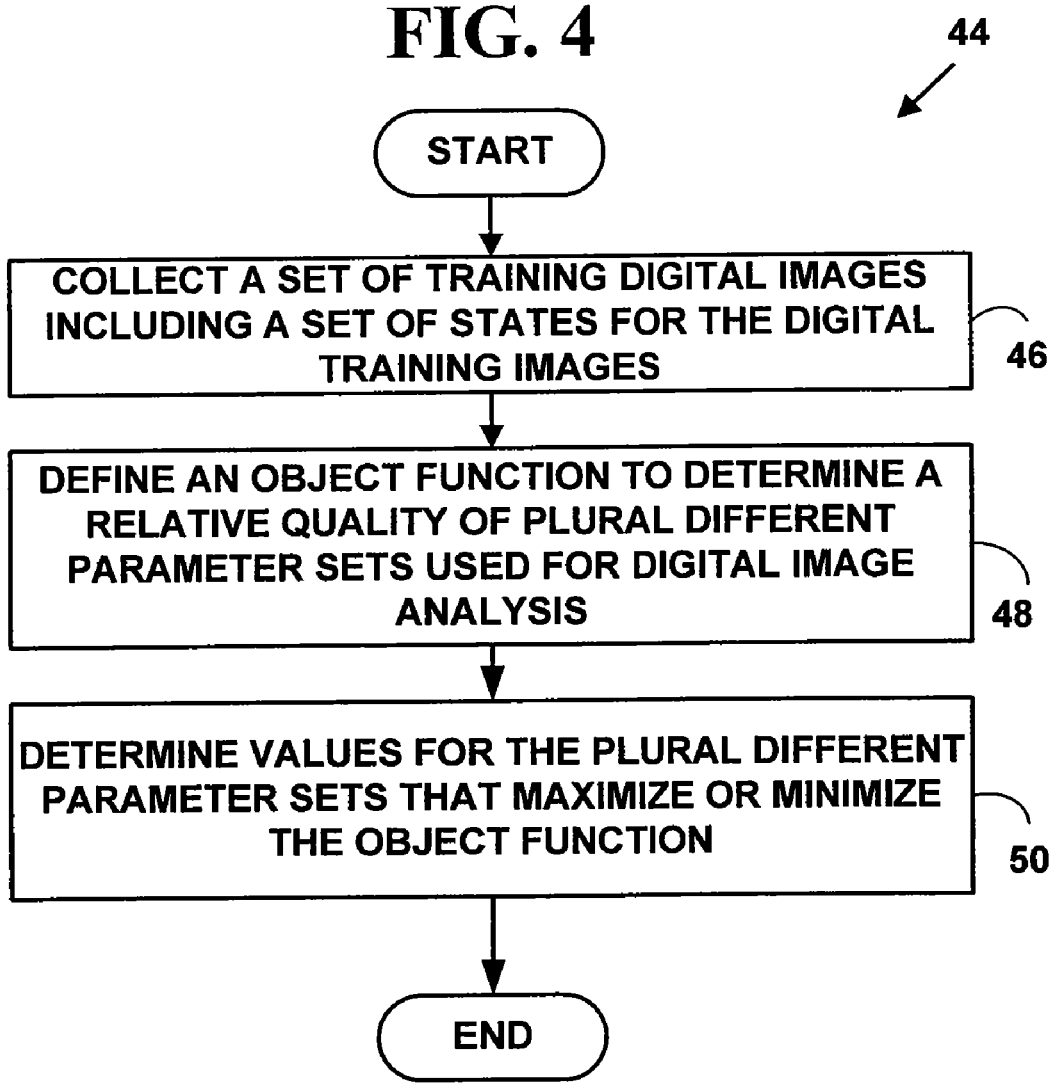
FIG. 4 is a flow diagram illustrating a method for automatically determining digital image analysis protocol parameters.

FIG. 4 is a flow diagram illustrating a Method 44 for automatically determining digital image analysis protocol parameters. At Step 46, a set of digital training images are collected including a set of states for the set of digital training images. At Step 48, an objective function is defined to determine a relative quality of plural different parameter sets used for digital image analysis. At Step 50, values for the plural different parameter sets that maximize (or minimize) the objective function are determined.

Examples of parameters that can be analyzed using the methods of the invention include, but are not limited to, parameters that control the process of segmenting images into distinct objects; parameters that control how regions or objects of interest are identified within images; and parameters that control how measurements are computed on regions or objects of interest within images. In one embodiment, the methods further comprise validating the parameters on new (i.e., distinct from the training set) image data.

Method 44 is illustrated with an exemplary embodiment. However, the present invention is not limited to such an embodiment other embodiments can also be used to practice the invention.

Collecting a Set of Training Images

In such an exemplary embodiment at Step 46, a set of digital training images are collected. A "training set" (or "truth set") is a set of images labeled with their correct state. In HCS, a training set comprises one or more microplates treated with a chemical compound known to elicit relevant biological condition. In one embodiment, training images are divided into at least two sets, whereby a first set is labeled as one state and a second set is labeled as a second state, etc. In another embodiment, each distinct object in each image is labeled with its corresponding state.

Often, half of the wells on a microplate are treated such that the cells are maximally stimulated and the other half are left untreated as negative controls. This is known as a minimum/maximum (min/max) microplate. Another possibility is to apply stimulant in graduated doses. A digital image data captured from a microplate is labeled to reflect its biological state(s). It is easiest to label the data at the well level since it is known how each well was prepared. However, not all cells in a well will be in the same biological state and it is possible to assign "truths" at the cellular or sub-cellular levels for selected cells in a selected well.

In one embodiment, a training set of digital images is representative of conditions expected while running an assay in screening mode. All of the example data presented herein was obtained from a 96-well microplate containing HeLa cells stained to track NF-κB, a DNA transcription factor. However, the present invention is not limited to such an embodiment, and other sized microplates, cell types and factors can be used to practice the invention.

FIG. 5 is a block diagram 52 illustrating images from an exemplary NFκB marker channel.

In the example microplate, a truth was applied at the well level, using knowledge of how each well was treated. The example digital images in FIG. 5 show an NFκB translocation effect elicited by the treatment with TNF-α (e.g., 50 ng/ml). In FIG. 5, example images of an exemplary NFκB marker channel from a training set include (A) Untreated, Well C02, Field 1; and (B) Treated with TNF-α, Well C11, Field 1.

FIG. 6 is a block diagram 54 illustrating applying the image mask 36 to cytoplasm-to-nucleus translocation to an NF-κB assay.

In FIG. 6 images of fluorescently labeled nuclei (image A) are acquired and used to derive masks 36 (image B) representing the nucleus and cytoplasm. Images acquired in a second channel track fluorescently labeled NF-κB. A basal response (image C) shows NF-κB distributed throughout the cytoplasm. Cells treated with TNF-α (image D) exhibit translocation to the nucleus. The intensity of the image pixels in the target channel is computed in regions covered by the nucleus and cytoplasm masks 36 for each cell as indicated by colored overlays for the untreated (image E) and treated (image F) wells.

Defining an Objective Function Used to Rate Different Parameter Sets

Returning to FIG. 4 at Step 48, an objective function is defined to determine a relative quality of plural different parameter sets used for digital image analysis. The objective function is used to determine a relative "goodness" of the different plural parameter sets. The "objective" function is variously referred to as a "merit" or "fitness" function.

An objective function is defined with respect to the measurements or features derived from an assay. As discussed above, one goal of the example assay is to measure the degree to which NF-κB is present in the nucleus as compared to the cytoplasm. One known method to measure cytoplasm to nucleus translocation (See, e.g., U.S. Pat. No. 5,989,835) is to compute a difference in an average intensity of a fluorescence signal under masks sampling the nucleus and the cytoplasm (see FIG. 5 and FIG. 6).

There are many possible ways to compute the objective function from the features computed by the image analysis method. In one embodiment, a Z'-factor statistic was used as a starting point since it is familiar to most HCS practitioners and is closely related to the Fisher ratio (See Equation (8)) frequently cited in pattern recognition literature. Z' is an appropriate objective function for min/max data sets as shown. A first Z' is computed as is illustrated in Equation (1):

$$Z' = 1 - \frac{3(s_+ + s_-)}{|\bar{x}_+ - \bar{x}_-|}, \quad (1)$$

where "s" is a standard deviation and "$\bar{x}$" is an average of measurements derived from groups of cells. The subscripts denote positive (+) or negative (−) phenotypic groupings of cells. The larger Z' is, the better the separation of the distributions of treated (positive) and untreated (negative) samples. The theoretical upper limit of Z' is unity, but a Z' of about 0.3 or greater is generally considered to indicate an acceptable assay.

Figure 7:
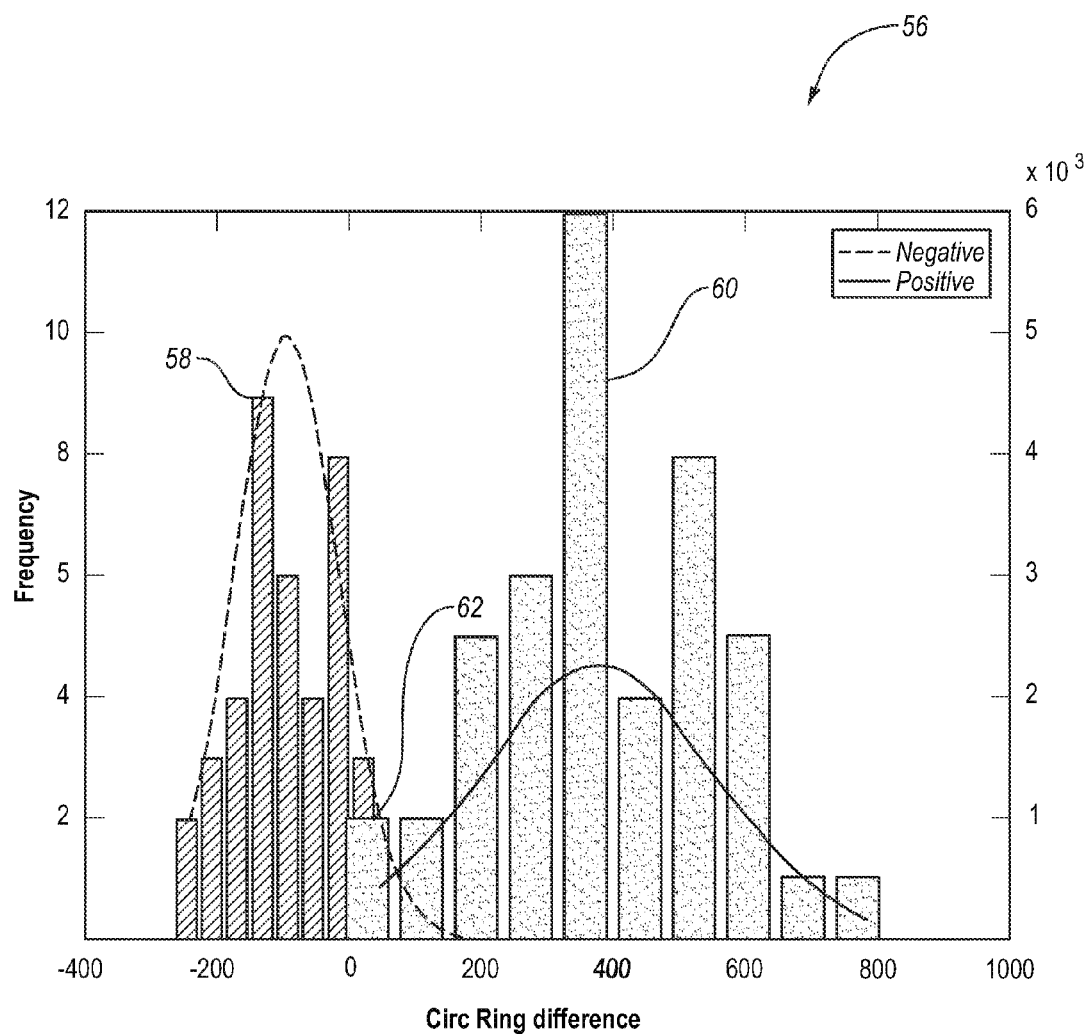
FIG. 7 is a block diagram illustrating histograms of average intensity difference between the nucleus and cytoplasm.

FIG. 7 is a block diagram 56 illustrating histograms 58, 60 of average intensity differences between the nucleus and cytoplasm. In FIG. 7, histograms of the average intensity between the nucleus and cytoplasm (i.e., Circ Ring Difference) differ for cells treated with TNF-α (e.g., 50 ng/ml, well C11, field 1, wider bars) and for untreated cells (e.g., well C02, field 1, thinner bars).

The histograms from cells in one treated field 58 and one untreated field 60 in FIG. 7, and the statistics in Table 1, indicate that Z' is a reasonable objective function for the protocol optimization problem. The distributions of both the treated 58 and untreated 60 cells appear roughly normal, their skewness is close to zero, and their kurtosis is close to three (i.e., the theoretical values for the normal probability density function). However, there was some overlap 62 in the distributions. By applying truth at the well level, it is possible that some cells could be misclassified. Misclassification seemed apparent in non-responding cells in the lower left corner of the treated well (panel B in FIG. 5). Thus a method is designed to compensate for this overlap.

TABLE 1

|  | Mean | Standard Deviation | Skewnesss | Kurtosis |
|---|---|---|---|---|
| Untreated (min) | 383.5 | 176.1 | −0.51 | 2.70 |
| Treated (max) | −90.0 | 79.7 | 0.110 | 2.76 |

As discussed above, it is possible to assign truths at the cell level. One method for doing this is a time-consuming manual process. As an alternative, an automated method is used. The tails of the histogram are clipped, removing a fixed fraction (e.g., 0.06 in the tests presented here) of the cells with highest and lowest feature measurements. This will be referred henceforth as the modified Z' criterion. This has the effect of improving the accuracy of the truth information (by discarding outliers) without intense manual intervention on the part of the user.

While many cell populations within a well are homogeneous, the concept of outlier removal via clipping histogram tails—or by some other means—will have value in some situations. For example, when foreign material is present on the slide or microplate it may be confused for cells and skew the statistics.

When object selection parameters are optimized, Z' is not an acceptable objective function: a Z' of unity (its maximum possible value) can be obtained by setting the selection parameters such that only one object from the negative set and one object from the positive set are selected as cells. Acceptable results have been obtained by instead either maximizing the test statistic t between the means of the min and max populations or minimizing the p-value from a t-test. These statistics both favor solutions that contain a large number of samples as well as produce good separation. They do this by using the fact that the variance of each population mean estimate is inversely proportional to the number of samples in the population.

Embodiments of defining the objective function include, but are not limited to, those listed in Table 2.

TABLE 2

1. Determining one minus three times a sum of standard deviations for two classes divided by absolute difference in means of two classes (Equation (1));
2. Determining the Fisher ratio (i.e., a square of difference in means of two classes divided by a square of the sum of the standard deviations for the two classes) (Equation(8)).
3. Determining an absolute value of test statistic as is illustrated in Equation (2):

$$t = \frac{\bar{x}_+ - \bar{x}_-}{\sqrt{\left(\frac{S_+^2}{n_+}\right) + \left(\frac{S_-^2}{n_-}\right)}} \quad (2)$$

where n is the number of positive or negative samples as denoted by the subscript.
4. Determining a p value of a t-test for the difference in the means of two classes.
5. Determining the mutual information between states and outputs of the image analysis operations.

For each 1-5 above, a portion of the largest and smallest samples may optionally be omitted from the computation for the purpose of excluding outliers.

Identifying the Values of the Parameters that Maximize (or Minimize) the Objective Function.

Returning to FIG. 4 at Step 50, values for the plural different parameter sets that maximize (or minimize) the objective function are determined.

In one exemplary embodiment at Step 50, one or more pre-determined methods 64 and/or 76 are used to determine the plural different parameter set values that maximize an objective function. However, the present invention is not limited to such an embodiment, and other embodiments can also be used to practice the invention at Step 50.

Figure 8:
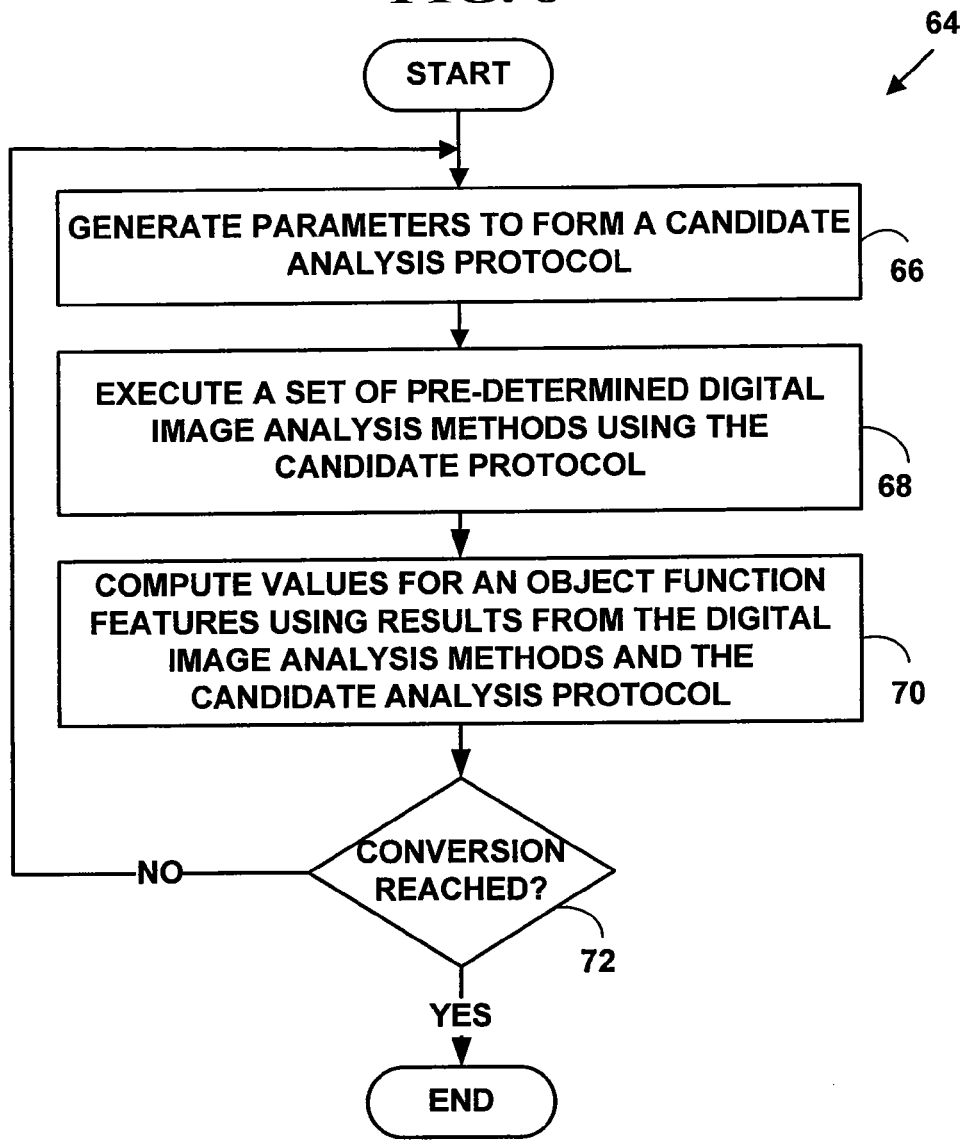
FIG. 8 is a flow diagram illustrating a method of identifying values of protocol parameters that maximize an objective function.

FIG. 8 is a flow diagram illustrating a Method 64 for identifying values of protocol parameters that maximize an objective function. At Step 66, parameters are generated to form a candidate analysis protocol. At Step 68, a set of pre-determined digital image analysis methods are performed on the training images using the generated parameters. At Step 70, an objective function is computed using results from the one or more digital image analysis methods and the candidate protocol. At Step 72, a test is conducted to determine whether the objective function has converged based on pre-determined conversion criteria. If so, the method ends. If not the method loops until pre-determined conversion is reached.

FIG. 8 illustrates a method of finding values of image analysis parameters to form a candidate protocol that maximizes the objective function. Similar methods are used to form a candidate analysis protocol that minimizes the objective function. Method 64 comprises looping through the steps of creating and evaluating candidate protocols—each with different image analysis parameters—until a convergence criterion has been satisfied. Example convergence criteria, include, but are not limited to: (1) a value of an objective function exceeds a threshold; (2) an objective function does not improve after a given number of iterations; or (3) all possible combinations of parameter values have been tried. Criteria such as these may be used individually or combined.

Protocol parameters are either discrete or they can be made discrete by dividing the range of the parameter into reasonably sized steps. With a discrete parameter space, exhaustively enumerating all possible combinations of parameters to identify the set that maximizes the objective function is possible, but the computational cost increases exponentially with the number of parameters. Thus, exhaustive enumeration is practical only when the parameter space to search is small.

Optimization techniques such as hill climbing have been applied in other problem domains but are not applicable here because the objective function is not differentiable with respect to the protocol parameters.

Figure 9:
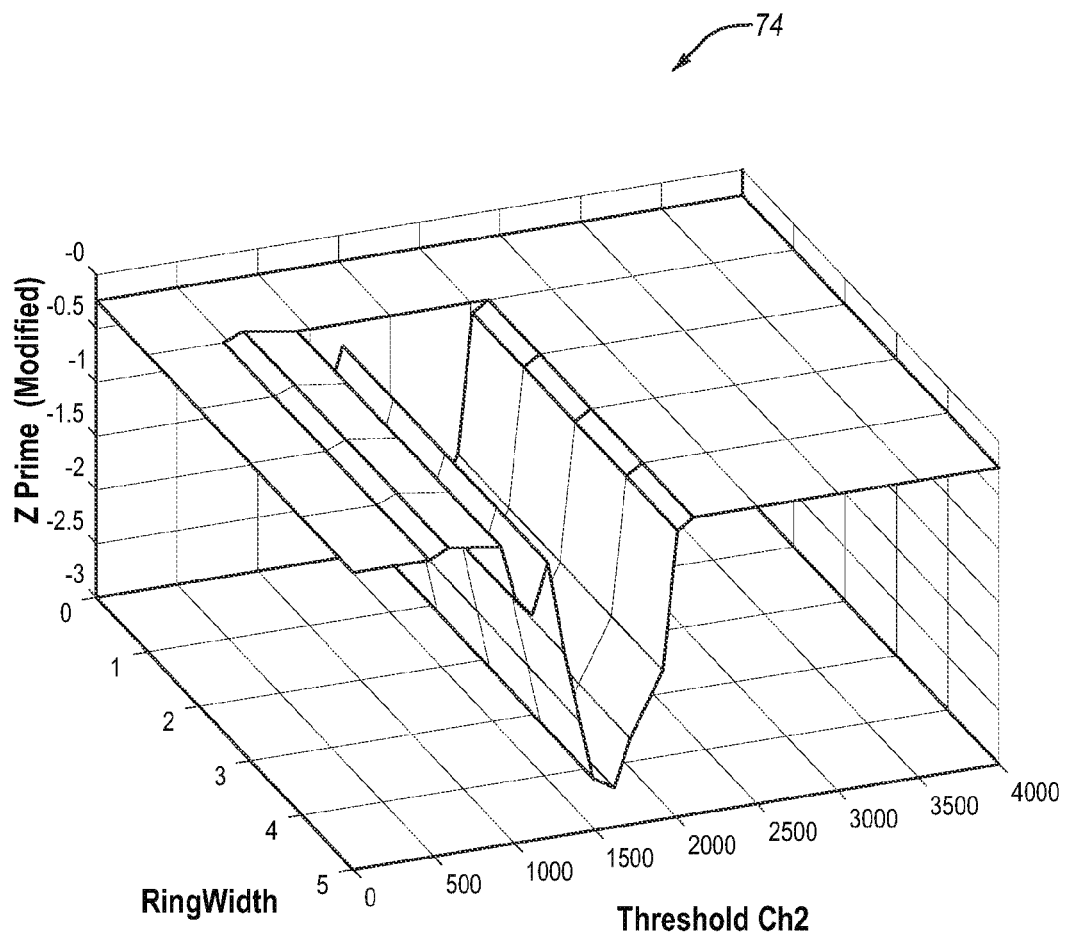
FIG. 9 is a block diagram illustrating a modified Z' criterion as a function of the cytoplasmic ring width and threshold parameters for the example images of FIG. 5.

FIG. 9 is a block diagram 74 illustrating a modified Z' criterion as a function of the cytoplasmic ring width and threshold parameters for the example images of FIG. 5.

FIG. 9 illustrates what an exemplary objective function looks like for the example test case. It is discontinuous, not convex, and not differentiable. Thus a stochastic (randomized) search is needed. In one embodiment of the invention, a genetic searching method (GA) has been applied to solve the protocol optimization problem. The GA method includes, but is not limited to, (1) representing the image analysis parameters comprising the protocol as simulated chromosomes; (2) randomly generating an initial population of simulated chromosomes; and (3) improving the population through a number of generations of simulated evolution. Other stochastic and discrete optimization techniques may be appropriate for the GA searching method and the present invention is not limited to the GA search method described (see e.g. simulated annealing, integer programming, and stochastic programming. See, e.g., "Genetic Algorithms in Search Optimization and Machine Learning," by David E. Goldberg, Khwer Academic Publishers, Boston, Mass. 1989, etc.).

Figure 10:
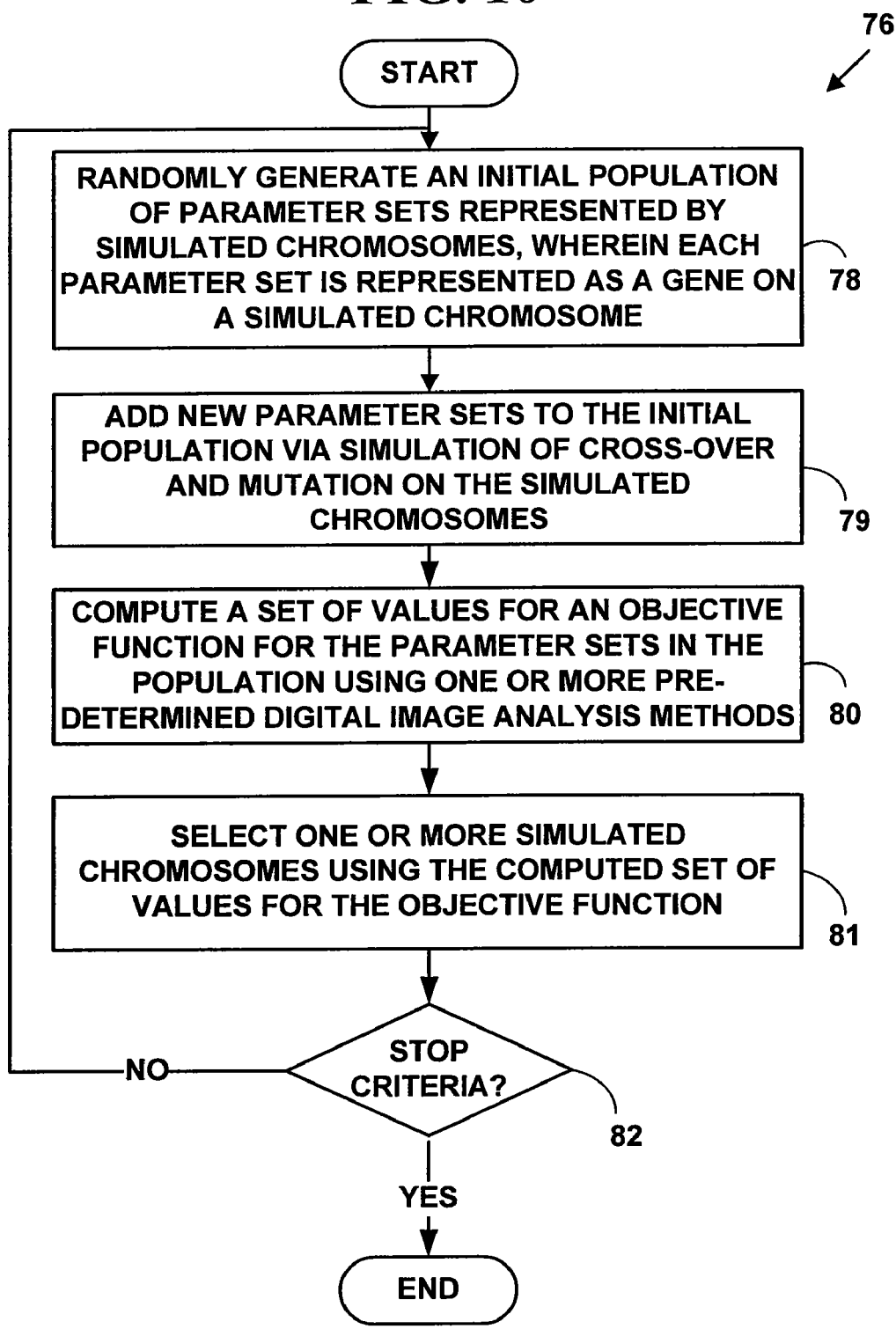
FIG. 10 is a flow diagram illustrating a method for genetic searching.

FIG. 10 is a flow diagram illustrating a Method 76 for genetic searching also known as a GA method. At Step 78, an initial population of parameter sets as represented by simulated chromosomes, where each parameter in the protocol is represented as a gene on the chromosome, is randomly generated. Thereafter, a number of iterations of simulated evolution are completed to improve parameter sets for use as analysis protocols. At Step 79, new protocols are added to the population via simulation of cross-over and mutation on the simulated chromosomes. At Step 80, a set values for an objective function is computed for each of the parameter sets in the population using one or more pre-determined digital image analysis methods. At Step 81, one or more simulated chromosomes (analysis protocols) are selected using the computed values. Chromosomes that are not selected are discarded. At Step 82, a test is conducted to determine whether pre-determined stop criteria have been met. If so, the method ends. If not the method loops until pre-determined stop criteria have been met.

Method 76 may also search the pre-determined genetic parameters by simulating evolution of the pre-determined genetic factors (e.g., mutation, cross over, etc.). Such genetic methods have previously been applied to problems such filter circuit design, scheduling, etc.

Implementation

In one embodiment, the invention provides an application 30 to (1) vary protocol parameters, (2) run HCS image analysis methods on a training set of digital images; (3) compute and store an objective function (e.g. Z'). The user can specify at least the exemplary parameters illustrated in Table 2A as input to the application 30.

TABLE 2A a training set of microplates, wells, and fields, from which digital images are collected
a base analysis protocol, which controls protocol parameters to tune and their ranges, and
an objective function and its parameters The application 30 automatically performs the optimization and records the parameters for the best protocol along with the corresponding objective function value. The application 30 implements an exhaustive optimization method 64 (e.g., FIG. 8) or with a genetic method 76 (e.g., FIG. 10) and allows the user to choose which optimization methods to use. The exhaustive searching mechanism accommodates any number of parameters via a recursion mechanism and was used to produce the plot in FIG. 9.

The methods described herein may be applied to a monolithic application as described here or to individual processing steps within the HCS image analysis method.

Validation Testing

The final step in the process is to check the parameters that are output from the search method to ensure that they are reasonable. Testing the performance of the resulting parameters on independent data and inspecting image overlays that help to visualize processing are two ways to validate the results.

Example Experimental Results

An analysis protocol consisting of parameters that were hand-optimized by an individual with expert domain knowledge was used for comparison with the automated method. An automated process was applied to tune four of the feature calculation parameters as indicated in Table 3 (see, FIG. 3.)

See FIG. 3 along with the attending discussion, for the meaning of the first three parameters. Target Threshold, is the threshold applied to the mask in the target (e.g. NFκB) channel: if the value of a target image pixel—under either mask—is less than the threshold, that pixel is removed from the mask.

TABLE 3

| Parameter | Min | Max | Step |
|---|---|---|---|
| Ring Distance (a) | 0 | 5 | 1 |
| Ring Width (b) | 0 | 5 | 1 |
| Circ Modifier (c) | 2 | 2 | 1 |
| Target Threshold | 0 | 4095 | 100 |

Table 3 includes parameter ranges for the optimization test. The letters following the parameter names refer to their illustrations in FIG. 3. The steps only apply to the exhaustive search method. Step size is unity for all parameters in the GA method. An initial series of tests was run using a single untreated field and a single field treated with TNF-α. Each field contained about 100 cells.

The results, listed in Table 4, illustrate that the GA is highly effective in finding good parameters. The "exhaustive" search was not truly exhaustive since the threshold parameter was varied in increments of 100 (resulting in 45,360 combinations). The exhaustive search solution 64 was slightly better than the GA solution 76 in terms of the best Z', but required far more processing time.

TABLE 4

| Search Type | Time (hours) | Best Z' (modified) |
|---|---|---|
| Manual | — | −0.3832 |
| "Exhaustive" Method 64 | 5.7 | −0.1748 |
| "Genetic" Method 76 (GA) | 0.31 | −0.1890 |

Table 4. illustrates single field per class optimization results. To further validate the approach, cells were used in nine untreated wells and nine wells treated with TNF-α to run the optimization. The results from the optimization were validated manually by examining the output parameters and overlays, and by comparing the Z' statistics with those computed on independent test data (different plates).

The GA 76 is a stochastic optimization method. Thus the final result may vary from one trial to the next. Three optimization trials were run to judge the impact of the randomness. Results from the three trials are tabulated in Table 5. GA converged in a maximum of 175.8 minutes. GA found different—but not radically different—parameters in each trial. Following the GA optimization with a hill climbing optimization on the best individual has the potential to make the resultant parameters better and more consistent from run to run.

Finally, the best set of parameters found was compared using GA to the set of protocol parameters manually created by an expert in terms of the Z' (without clipping tails) on the well-level data from three entire plates with 24 untreated and 24 TNF-α treated wells per plate. As seen in Tables 5 and 6, the GA parameter set outperforms the manual protocol in two out of three test cases. In general, it cannot be expected that GA will find a better parameter set than a trained expert. Rather, that GA will usually yield a parameter set with practical utility.

Table 5 illustrates outcomes for three trials of GA optimization compared to the manual protocol. Table 6 illustrates comparison of the performance between manual protocol parameters and those 'learned' using GA.

TABLE 5

| Trial | Time (minutes) | Z' | Ring Distance | Ring Width | Circ Modifier | Target Threshold |
|---|---|---|---|---|---|---|
| Manual | — | — | 1 | 2 | 0 | 25 |
| 1 | 170.0 | −0.2463 | 0 | 1 | 0 | 155 |
| 2 | 175.8 | −0.2367 | 0 | 1 | 1 | 857 |
| 3 | 126.6 | −0.2446 | 0 | 2 | 0 | 704 |

TABLE 6

| | Z' | |
|---|---|---|
| Data Set | Manual Parameter Set | Genetic Method Parameter Set |
| Batch 1, plate 1 AS98 (training plate) | 0.5466 | 0.5864 |
| Batch 2, plate 1, cus 3 | 0.7321 | 0.6532 |
| Batch 3, plate 1, AS23 | 0.6607 | 0.6662 |

FIG. 11 is a block diagram 84 illustrating a difference between the manual protocol and GA parameter settings.

FIG. 11 illustrates a comparison of protocol parameters from manual protocol and GA method 76 on untreated cells. Boundaries of nuclear masks are shown in blue and boundaries of cytoplasmic masks in green.

FIG. 11 illustrates the difference between the manual protocol and GA parameter settings via graphical overlays depicting the nuclear and cytoplasmic ring masks. Note that the ring structures determined by the GA optimization are narrower, tighter to the nucleus, and conform better to the cytoplasm. Thus, the improved performance is expected.

Other testing indicates that optimizing the p-value from a t-test is an effective way to optimize object selection parameters.

Primitive Features for Measuring Radial Fluorescence Distribution

The methods described herein can be further refined to improve search results. One refinement includes measuring radial fluorescence distributions.

Figure 12:
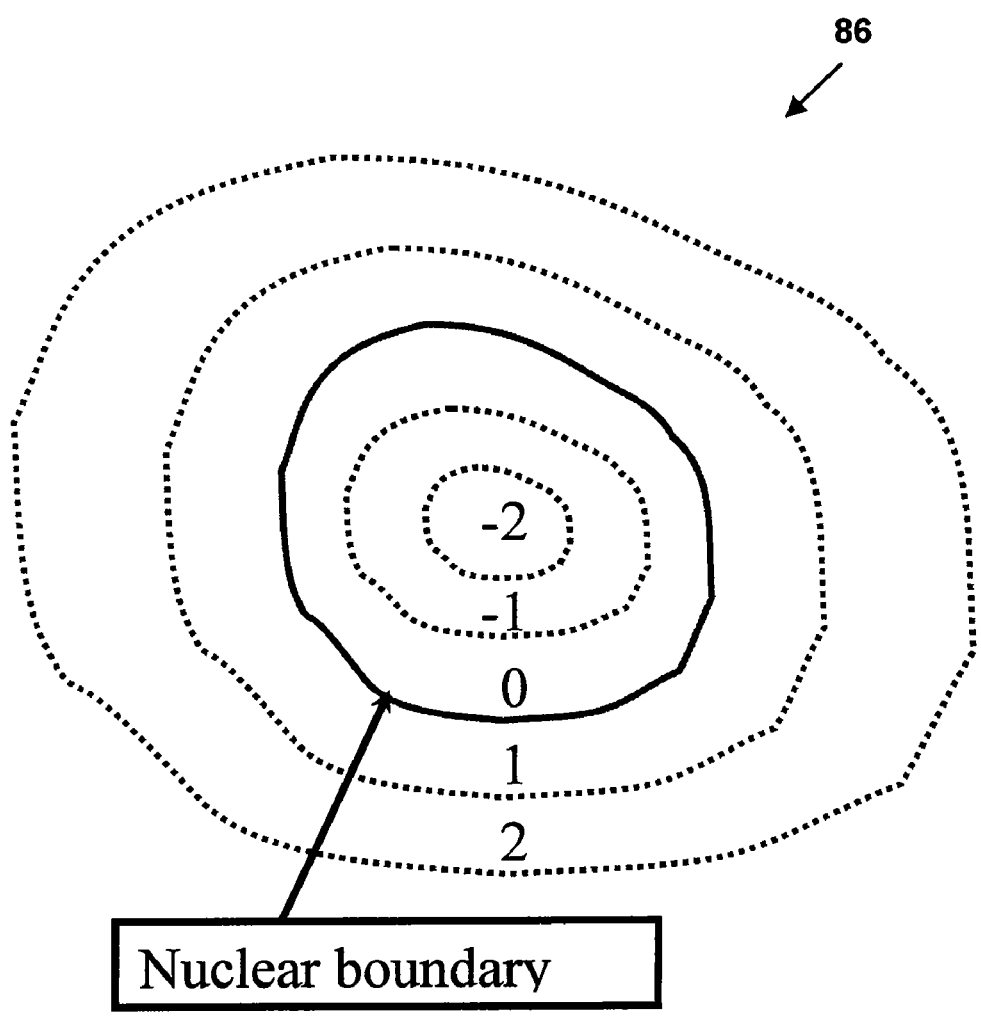
FIG. 12 is a block diagram illustrating primitive features used to measure the radial fluorescence intensity distribution with respect to the cell nucleus.

FIG. 12 is a block diagram 86 illustrating primitive features used to measure the radial fluorescence intensity distribution with respect to a cell nucleus. The primitive features comprise obtaining total intensities under a set of thin (possibly 1 pixel wide) annular masks that cover a cell.

If the primitive features are denoted $x_{-n}, \ldots, x_{-1}, x_0, x_1, \ldots, x_{-m}$, a measurement of nuclear translocation may be defined as a linear combination (weighted sum) of the features illustrated in Equation (3):

$$\text{translocation} = w_{-n}x_{-n} + \ldots + w_{-1}x_{-1} + w_0 x_0 + w_1 x_1 + \ldots + w_m x_m, \quad (3)$$

where w terms are weights. In vector notation, the measurement may be expressed as is illustrated in Equation (4):

$$\text{translocation} = | w_{-n} \wedge \; w_{-1} \; w_0 \; w_1 \wedge \; w_n | \begin{vmatrix} x_{-n} \\ x_{-1} \\ x_0 \\ x_1 \\ x_n \end{vmatrix} = \underline{w}^T \underline{x}. \quad (4)$$

Traditional Circular and Ring Structures Derived from the Radial Distribution

Traditional circular/ring translocation measurements can be defined by selecting appropriate weights in Equation (4). For example, to compute, as a translocation measurement, a difference between average intensities in a circular mask one pixel inside a nucleus and a ring mask one pixel wide and one pixel away from the nucleus (a=1, b=1, c=1 in FIG. 3) exemplary weights would be $(1/(n_{-2}+n_{-1}), 1/(n_{-2}+n_{-1}), 0, 0, -1/n_2)$, where $n_{-k}$ is the number of pixels comprising mask the mask at index k, as is illustrated in Equation (5):

$$\text{translocation} = \frac{1}{n_{-2}+n_{-1}} x_{-2} + \frac{1}{n_{-2}+n_{-1}} x_{-1} - \frac{1}{n_2} x_2, \quad (5)$$

or in vector notation as illustrated in Equation (6):

$$\text{translocation} = \begin{vmatrix} \frac{1}{n_{-2}+n_{-1}} & \frac{1}{n_{-2}+n_{-1}} & 0 & 0 & -\frac{1}{n_2} \end{vmatrix} \begin{vmatrix} x_{-n} \\ x_{-1} \\ x_0 \\ x_1 \\ x_n \end{vmatrix} \quad (6)$$

$$= \underline{w}^T \underline{x}.$$

In general, if the mask indices are (−M:0) for masks inside the nucleus, and (1:n) for masks outside of the nucleus, weights required to compute a translocation measurement, as a difference between average intensities in a circular mask with parameter c in FIG. 3 and a ring mask with parameters a and b in FIG. 3, are illustrated in Equation (6a):

$$w_k = \begin{cases} \dfrac{1}{\sum_{p=-M}^{-c} n_p} & \text{if} \quad -M \le k \le -c, \\ -\dfrac{1}{\sum_{p=a+1}^{a+b} n_p} & \text{if} \quad a+1 \le k \le a+b, \\ 0 & \text{otherwise.} \end{cases} \quad (6a)$$

These new radial intensity distribution measurements are used to rapidly test different circular/ring configurations while optimizing an analysis protocol. Rather than repeating the time-consuming digital image analysis steps of (1) segmentation; (2) labeling cell nuclei; (3) computing masks; and (4) integrating intensities under the masks; radial intensity profiles for sets of positive and negative cells are saved and different circular/ring combinations are tested just by changing the weights, w (i.e., without repeating the image analysis). This speeds up significantly both the generic and the exhaustive search methods 64 previously disclosed.

Figure 13:
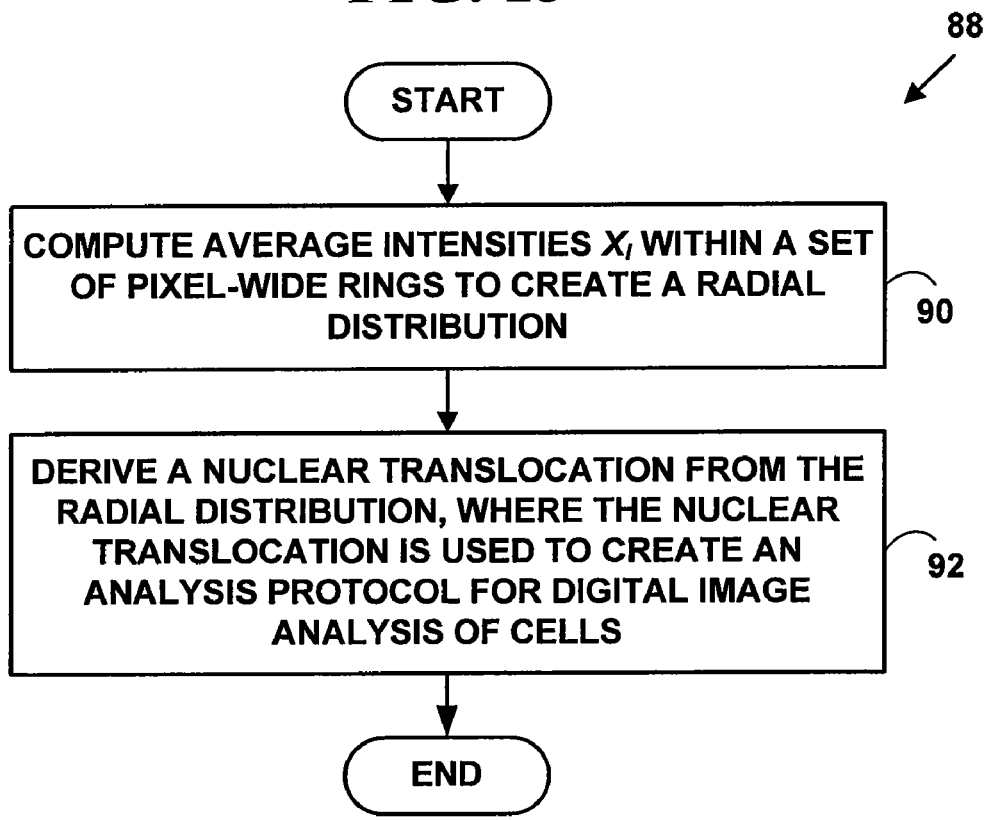
FIG. 13 is a flow diagram illustrating a method for measuring radial fluorescence distribution.

FIG. 13 is a flow diagram illustrating a Method 88 for measuring radial fluorescence distribution. At Step 90, total intensities $x_i$ are computed with a set of rings of a pre-determined size to create a radial distribution. At Step 92, a nuclear translocation is derived from the radial distribution.

Arbitrary Linear Combinations Derived from the Radial Distribution

If the constraint that a measurement resemble a traditional circular/ring is removed (i.e., if each of the weights can assume any value), and if the objective function described above is modified slightly, an optimal solution can be obtained almost instantaneously (e.g., Equation (9)) In order to optimize parameters, a objective function, is needed to indicate the relative quality of different parameter sets. Equation (7) illustrates an exemplary objective function:

$$Z' = 1 - \frac{3(s_+ + s_-)}{|m_+ - m_-|}, \quad (7)$$

where m is the arithmetic mean, s is the standard deviation, and the subscripts denote positive (+) or negative (−) phenotypes. A similar equation was illustrated in Equation (1). In another embodiment, instead of Z' the closely-related Fisher Criterion is maximized as is illustrated in Equation (8):

$$J = \frac{(m_+ - m_-)^2}{s_+^2 - s_-^2}. \quad (8)$$

The Fisher Criterion, well known in pattern recognition literature, is similar in that it rewards solutions where the means are well separated and the standard deviations are small and has the added advantage of a closed-form solution for the optimal weights as is illustrated in Equations (9) and (10):

$$\underline{w} \propto S_w^{-1}(\underline{m}_+ - \underline{m}_-), \quad (9)$$

where $$S_w = \sum_{\underline{x}_n \in C_+} (\underline{x}_n - \underline{m}_+)(\underline{x}_n - \underline{m}_+)^T + \sum_{\underline{x}_n \in C_-} (\underline{x}_n - \underline{m}_-)(\underline{x}_n - \underline{m}_-)^T, \quad (10)$$

is the between-class scatter matrix, $C_+$ is the set of positive samples, and $C_-$ is the set of negative samples. Note that the magnitude of the optimal weight vector is arbitrary and the magnitude is set to be unity in this example.

Figure 14:
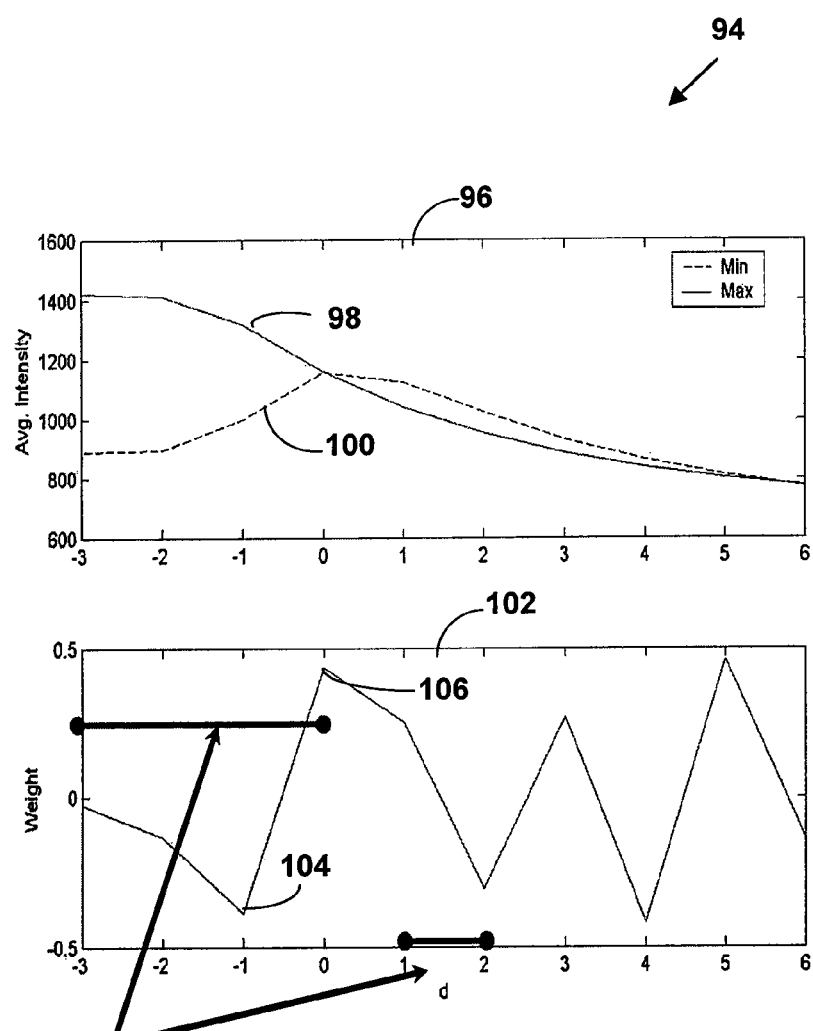
FIG. 14 is a block diagram illustrating plots of average intensity measurements and weights for the digital images of FIG. 5.

FIG. 14 is a block diagram 94 illustrating plots of average intensity measurements 96 and weights 102 for the digital images of FIG. 5.

The top graph 96 in FIG. 14 plots the average intensity measurements within each pixel-wide ring mask for one treated (max) and one untreated (min) cell. The plots are an exemplary visualization of the radial intensity profile of the NFκB concentration within the cell. Note that NFκB is concentrated inside the nucleus (d≦0) for the TNF-α treated cell and outside the nucleus (d≧0) for the untreated cell. Thus there is an obvious translocation effect.

Optimal weights using Equations (9) and (10) were computed using 24 wells, 2 fields per well (i.e., between 4500 and 5000 cells) each for positive (treated or max) and negative (untreated or min) samples. Note that this is far more training data than the genetic algorithm approach can typically accommodate.

In FIG. 14, the top graph 96 plots the fluorescence intensity profile as a function of the distance from the nuclear boundary for a typical treated 98 (solid red line) and a typical untreated 100 (dashed blue line) cell. The bottom graph compares the optimal weights to the weights for a traditional circular/ring structure.

The resulting weights, plotted in the bottom graph 102 of FIG. 14, the weights are interpreted as computing slopes at various points on the intensity profiles. For example, the weights for d=(−1) 104 and d=zero 106 (approximately −0.5 and 0.5 respectively) yield a weighted sum proportional to the slope of the line between d=(−1) and d=zero. It can be observed that such slopes are a robust discriminator since the slope of the line is positive for the untreated cells, but negative for the treated cells.

Performance of the optimal weights was determined on independent test data (plates not used to determine the weights) for the NFκB marker. The test was repeated using a c-Jun assay instead of NFκB (all of the data presented here comes from cells dual labeled for NFκB and c-Jun). The results, tabulated in Table 7, show that the optimal features yield better performance than standard circular/ring features from a default analysis protocol.

TABLE 7

| Plate | Z' Default | Z' Optimal |
| --- | --- | --- |
| NFκB 1 | 0.6897 | 0.7253 |
| NFκB 2 | 0.5474 | 0.6742 |
| c-Jun | 0.3449 | 0.4138 |

A comparison of an optimal feature to an average intensity difference between circular and ring feature as computed in a default protocol hand-optimized by an expert. Z' windows were computed from 24 well-level features per class (positive/negative). These new optimal features can be derived very rapidly, even with a very large training set. Their disadvantage is that they may be difficult for a human to interpret. A new weighting scheme is used for allowing easier human interpretation.

Fuzzy Circular and Ring Masks Derived from the Radial Distribution

A new weighting scheme provides the best of both worlds: its parameters are easy to optimize, yet the resulting features are amenable to human interpretation.

Figure 15:
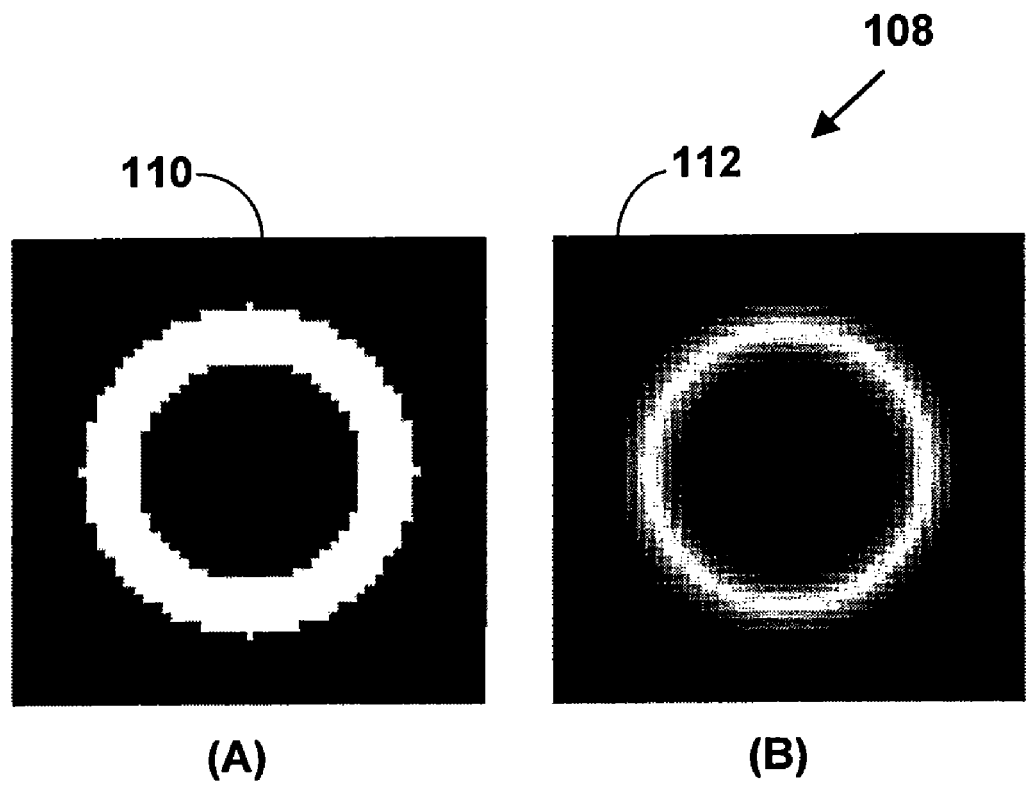
FIG. 15 is a block diagram illustrating solid (standard) and fuzzy and ring masks for a radial distribution.

FIG. 15 is a block diagram 108 illustrating solid (standard) 110 and fuzzy 112 ring masks for a radial distribution. In FIG. 15, weights are displayed as an image. The intensity is proportional to the magnitude of the weight at each image location for (A) a standard ring mask and (B) a fuzzy ring mask. The weights—as visualized in FIG. 15—yield masks that resemble the familiar ring mask except that they have smooth transitions between "under the mask" and "not under the mask". When the weights in Equation (4) are completely unconstrained, they can assume configurations that are difficult for a human to interpret (e.g. see FIG. 14). In one embodiment, the weights are set using a Gaussian kernel function as is illustrated in Equation (11). The Gaussian kernel has the shape of a bell curve.

$$w(d) = \frac{1}{\sigma\sqrt{2\pi}}\exp\left(-\frac{(d-d_0)^2}{2\sigma^2}\right) \quad (11)$$

Figure 16:
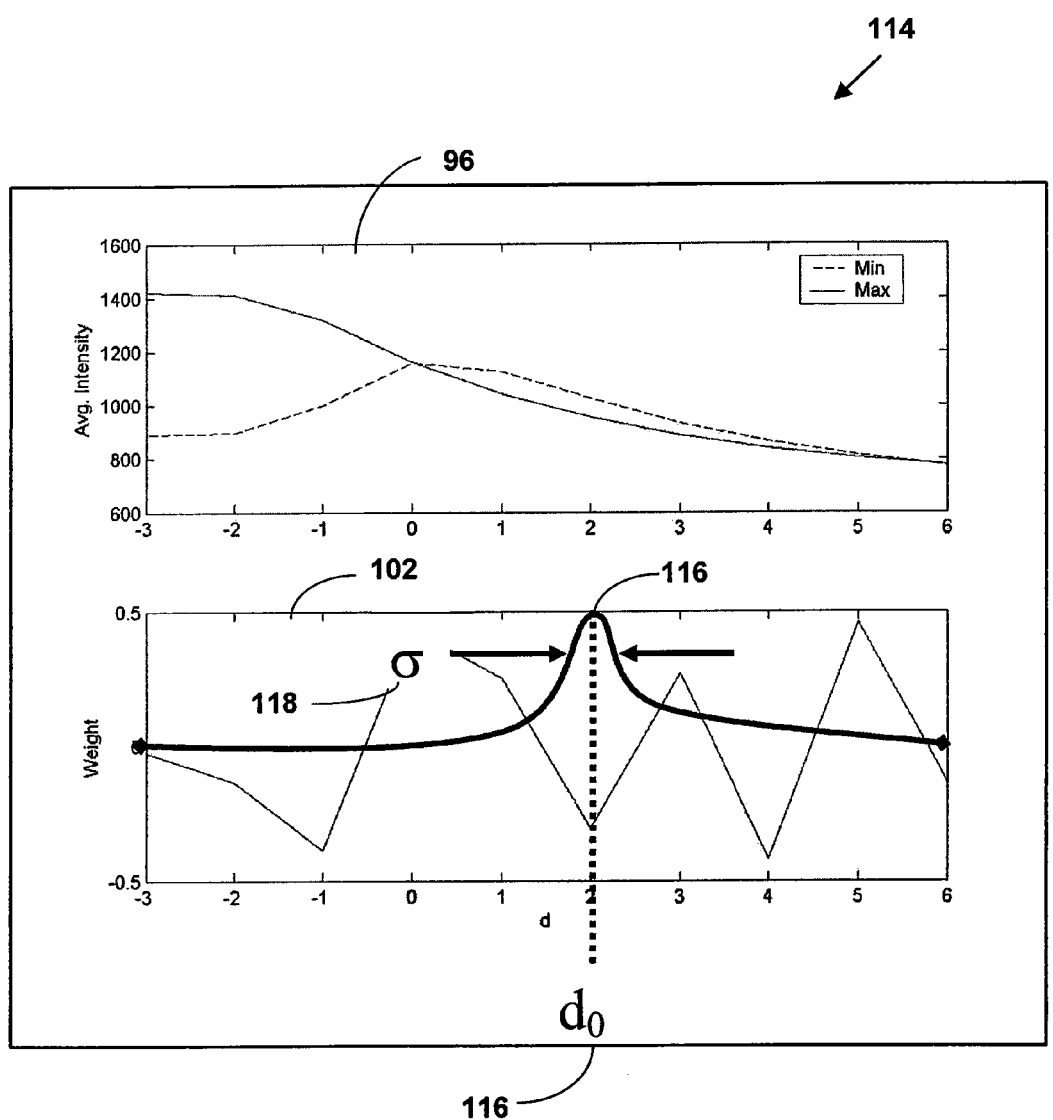
FIG. 16 is a block diagram illustrating plots of average intensity measurements and new weights for the digital images of FIG. 5.

FIG. 16 is a block diagram 114 illustrating plots of average intensity measurements and new weights for the digital images of FIG. 5.

The bottom portion 102 of FIG. 16 is a visualization of one possible ring-like structure 116 resulting from Equation (11). ($\sigma$ 118, $d_0$ 120). Similar circular structures may be derived in a similar manner (possibly applying constant weighting to the center of the circ and Gaussian weights to the edges) and are referred to as "fuzzy circular" and "fuzzy ring" masks since pixels exhibit partial membership to the sets "circular" and "ring". An average intensity $\bar{I}$ is computed within a mask as illustrated in Equation (12):

$$\bar{I} = \frac{\sum wx}{\sum w}. \quad (12)$$

After computing the average intensity in a fuzzy circular and a fuzzy ring, it is possible to compute the intensity difference between them for standard circular and ring masks.

With circular and ring features defined using a continuous kernel function like Equation 12, a derivative of the objective function can be computed with respect to the circular/ring parameters. Now hill-climbing optimization strategies can be used to find optimal parameters. In hill-climbing a gradient is computed at a (possibly random) starting point and following the path of steepest ascent to a peak. Hill-climbing can thus rapidly find a local maxima.

Features for Measuring Membrane Intensity

The methods and systems describe herein can be extended to other bio-applications that measure fluorescence intensity in the cell membrane (e.g., Cytoplasm to Cell Membrane Translocation, GPCR Signaling, etc.) by defining radial intensity primitives with respect to the cell membrane (as determined by a membrane marker) as were defined with respect to the nuclear membrane in FIG. 12.

Incorporating the New Optimization Methods into The Generic Assay Protocol Optimization Framework The invention described herein speaks specifically to the optimization of parameters that control measurement of radial intensity distribution (especially translocation). A number of other image analysis parameters (e.g. thresholds, object selection, etc.) can be optimized by the methods described herein other methods.

One approach is to use the previously disclosed genetic algorithm 76 or exhaustive search method 64 as a generic optimization method to search for optimal values of parameters for which specific optimization strategies have not been previously disclosed. For each candidate protocol identified by the generic search algorithm, a rapid search may be done for the optimal parameters that are covered by this invention.

As compared to the optimal solution of Equation (11) fuzzy rings are sub-optimal and more difficult to compute, but have the advantage of being easier for a human to interpret. The resulting masks also seem to be more natural than standard ones since nuclear boundaries do not conform precisely to pixel boundaries.

The method and system increases the usability of high content screening technologies by reducing a required level of expertise required to configure digital image processing.

It should be understood that the architecture, programs, processes, methods and systems described herein are not related or limited to any particular type of computer or network system (hardware or software), unless indicated otherwise. Various types of general purpose or specialized computer systems may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams.

While various elements of the preferred embodiments have been described as being implemented in software, in other embodiments hardware or firmware implementations may alternatively be used, and vice-versa.

The claims should not be read as limited to the described order or elements unless stated to that effect. In addition, use of the term "means" in any claim is intended to invoke 35 U.S.C. §112, paragraph 6, and any claim without the word "means" is not so intended.

Therefore, all embodiments that come within the scope and spirit of the following claims and equivalents thereto are claimed as the invention.

What is claimed is:

1. A computer product for automated digital image analysis of cells, the computer product comprising a processor and memory, the computer product programmed to:

compute a plurality of total intensities $x_i$ for each cell of a plurality of cells using a set of rings of a pre-determined size to create a radial distribution for the cell with respect to a nuclear boundary of the cell;

derive a nuclear translocation measurement for each cell from the radial distribution of the cell by using a weighted sum of the total intensities $x_i$ of the cell by computing:

$$translocation = \frac{1}{n_{-2}+n_{-1}}x_{-2} + \frac{1}{n_{-2}+n_{-1}}x_{-1} - \frac{1}{n_2}x_2,$$

where $x_{-i}$ comprises a total intensity x at index i and where $n_{-k}$ is a number of pixels comprising a mask at index k; and create an automated analysis protocol for digital image analysis using the nuclear translocation measurements derived for all of the cells.

2. The computer product of claim 1, wherein the computer product is programmed to compute the total intensities for each cell by using a set of thin annular masks that cover the cell.

3. A computer product as recited in claim 1, wherein the set of rings of a pre-determined size comprise a set of rings one pixel wide.

4. The computer product of claim 1, wherein the computer product is programmed to create an automated analysis protocol for digital image analysis by:
- collecting a set of digital training images;
- defining an objective function to determine a relative quality of a plurality of different parameter sets for the collected set of digital training images; and
- determining values for the plurality of different parameter sets that maximize or minimize the objective function.

5. A computer product for automated digital image analysis of cells, the computer product comprising a processor and memory, the computer product programmed to:
- compute a plurality of total intensities $x_i$ for each cell of a plurality of cells using a set of rings of a pre-determined size to create a radial distribution for the cell with respect to a nuclear boundary of the cell;
- derive a nuclear translocation measurement for each cell from the radial distribution of the cell by computing:

$$translocation = w_{-n}x_{-n} + \ldots + w_{-1}x_{-1} + w_0x_0 + w_1x_1 + \ldots + w_mx_m,$$

where $x_{-n}, \ldots x_{-1}, x_0, x_1, \ldots x_{-m}$, comprise the set of total intensities of the cell and where the w terms are weights, wherein each weight term is set using a Gaussian kernel function:

$$w(d) = \frac{1}{\sigma\sqrt{2\pi}} \exp\left(-\frac{(d-d_0)^2}{2\sigma^2}\right)$$

where d represents the distance from the nucleus boundary; and create an automated analysis protocol for digital image analysis using the nuclear translocation measurements derived for all of the cells.

6. A computer product for automated digital image analysis of cells, the computer product comprising a processor and memory, the computer product programmed to:
- compute a plurality of total intensities $x_i$ for each cell of a plurality of cells using a set of rings of a pre-determined size to create a radial distribution for the cell with respect to a nuclear boundary of the cell;
- derive a nuclear translocation measurement for each cell from the radial distribution of the cell by computing:

$$translocation = w_{-n}x_{-n} + \ldots + w_{-1}x_{-1} + w_0x_0 + w_1x_1 + \ldots + w_mx_m,$$

where $x_{-n}, \ldots x_{-1}, x_0, x_1, \ldots x_{-m}$, comprise the set of total intensities of the cell and where the w terms are weights, wherein each weight term is determined by:

$$w_k = \begin{cases} \dfrac{1}{\sum_{p=-M}^{-c} n_p} & \text{if} \quad -M \leq k \leq -c, \\ -\dfrac{1}{\sum_{p=a+1}^{a+b} n_p} & \text{if} \quad a+1 \leq k \leq a+b, \\ 0 & \text{otherwise} \end{cases}$$

wherein $w_k$ represents the weight at index k, M are mask indices for masks inside a nucleus, n are mask indices for masks outside the nucleus, a is a distance from a nuclear boundary to a cytoplasm mask, b is a width of a cytoplasm mask and c specifies a distance within the nucleus to place a nuclear mask; and create an automated analysis protocol for digital image analysis using the nuclear translocation measurements derived for all of the cells.

7. A non-transitory computer readable medium having stored thereon instructions that, when executed, perform the following method:
- computing a plurality of total intensities $x_i$ for each cell of a plurality of cells using a set of rings of a pre-determined size to create a radial distribution for the cell with respect to a nuclear boundary of the cell;
- deriving a nuclear translocation measurement for each cell from the radial distribution of the cell by using a weighted sum of the total intensities $x_i$ of the cell by computing:

$$translocation = \frac{1}{n_{-2} + n_{-1}} x_{-2} + \frac{1}{n_{-2} + n_{-1}} x_{-1} - \frac{1}{n_2} x_2,$$

where $x_{-i}$ comprises a total intensity x at index i and where $n_{-k}$ is a number of pixels comprising a mask at index k; and creating an automated analysis protocol for digital image analysis using the nuclear translocation measurements derived for all of the cells.

8. A system for automated digital image analysis, comprising in combination:
- means for computing a plurality of total intensities $x_i$ of a cell with a set of rings of a pre-determined size to create a radial distribution with respect to a nuclear boundary of the cell;
- means for deriving a nuclear translocation measurement of the cell from the radial distribution by using a weighted sum of the total intensities by computing:

$$translocation = \frac{1}{n_{-2} + n_{-1}} x_{-2} + \frac{1}{n_{-2} + n_{-1}} x_{-1} - \frac{1}{n_2} x_2,$$

where $x_{-i}$ comprises a total intensity x at index i and where $n_{-k}$ is a number of pixels comprising a mask at index k; and means for creating an automated analysis protocol for digital image analysis of cells by using the nuclear translocation measurement of the cell.

9. A computer product for automated digital image analysis of cells, the computer product comprising a processor and memory, the computer product programmed to perform a method comprising:
- collecting a set of digital training images of cells including a set of biological states for the set of digital training images;
- defining an objective function to determine a relative quality of a plurality of different parameter sets for the collected set of digital training images, the step of defining and using an objective function comprising measuring a radial fluorescence intensity distribution with respect to a cell nucleus by computing a nuclear translocation measurement with:

$$translocation = w_{-n}x_{-n} + \ldots + w_{-1}x_{-1} + w_0x_0 + w_1x_1 + \ldots + w_mx_m,$$

where $x_{-n}, \ldots x_{-1}, x_0, x_1, \ldots, x_{-m}$, comprise a set of total intensities under a set of thin annular masks that cover a cell and where the w terms are weights; and determining values for the plurality of different parameter sets that maximize or minimize the objective function.

* * * * *